United States Patent
Ichikawa et al.

(10) Patent No.: US 8,244,176 B2
(45) Date of Patent: Aug. 14, 2012

(54) SIGNAL PROCESSING UNIT

(75) Inventors: Yasuhisa Ichikawa, Nagoya (JP); Takuya Nagai, Nagoya (JP); Hironori Hirata, Nagoya (JP); Tsuyoshi Ohashi, Hashima (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 610 days.

(21) Appl. No.: 12/380,963

(22) Filed: Mar. 5, 2009

(65) Prior Publication Data

US 2009/0175396 A1  Jul. 9, 2009

Related U.S. Application Data

(63) Continuation-in-part of application No. PCT/JP2007/068726, filed on Sep. 26, 2007.

(30) Foreign Application Priority Data

Sep. 27, 2006 (JP) .................................. 2006-262241
Sep. 28, 2006 (JP) .................................. 2006-263924

(51) Int. Cl.
*H04B 7/24* (2006.01)
(52) U.S. Cl. ...... 455/39; 455/63.1; 455/67.11; 375/371; 340/572.1
(58) Field of Classification Search .................. 455/39, 455/63.1, 67.11; 375/371; 340/572.1
See application file for complete search history.

(56) References Cited

U.S. PATENT DOCUMENTS

| 2006/0049944 A1 | 3/2006 | Ishiguro et al. |
| 2007/0072567 A1 | 3/2007 | Nagai et al. |
| 2007/0111692 A1 | 5/2007 | Kuramoto et al. |

FOREIGN PATENT DOCUMENTS

| JP | 08 122429 | 5/1996 |
| JP | 09 116459 | 5/1997 |
| JP | 2000 091943 | 3/2000 |
| JP | 2001053642 | 2/2001 |
| JP | 2001291079 | 10/2001 |
| JP | 2003-069486 | 3/2003 |
| JP | 2003 187204 | 7/2003 |
| JP | 2003187204 | 7/2003 |
| JP | 2004-265377 | 9/2004 |
| JP | 2005101841 | 4/2005 |
| JP | 2005223822 | * 8/2005 |
| JP | 2005 328382 | 11/2005 |
| JP | 2006 041929 | 2/2006 |
| JP | 2006 081050 | 3/2006 |
| JP | 2006079217 | 3/2006 |
| JP | 2006085288 | 3/2006 |

* cited by examiner

*Primary Examiner* — Tuan H Nguyen
(74) *Attorney, Agent, or Firm* — McCarter & English LLP

(57) ABSTRACT

Since signal transmittance adjustment devices that can suppress transmittance of a receiving signal to a DSP as a receiving processing device from an antenna for reception and a signal transmittance control device configured to control the signal transmittance adjustment devices so that the transmittance of the receiving signal to the DSP from the antenna for reception is suppressed at least when a transmission signal including a modulation signal is transmitted from an antenna for transmission are provided, occurrence of a trouble in which a head portion of a reply signal is crushed by a wrap around signal from a transmission side can be suitably prevented, and particularly, favorable communication can be realized at start of a response from a RFID tag. That is, an apparatus for communicating with a RFID tag that can suitably suppress an influence of a transient response can be provided.

20 Claims, 18 Drawing Sheets

[FIG. 1]
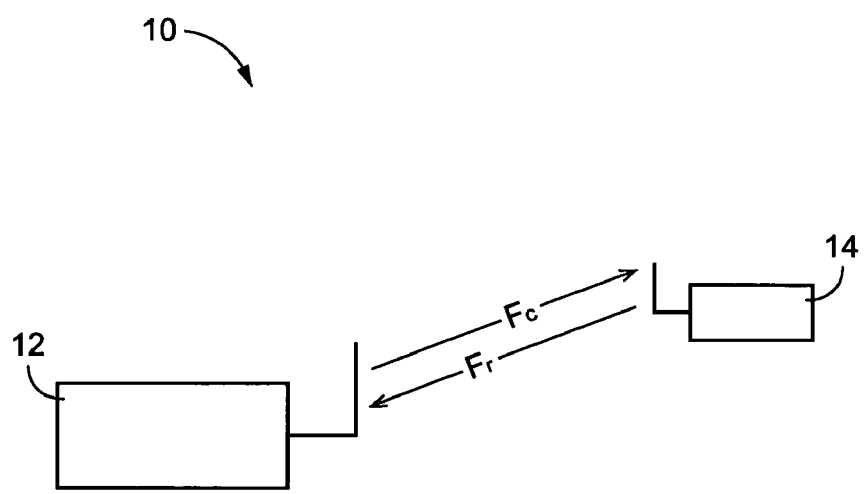

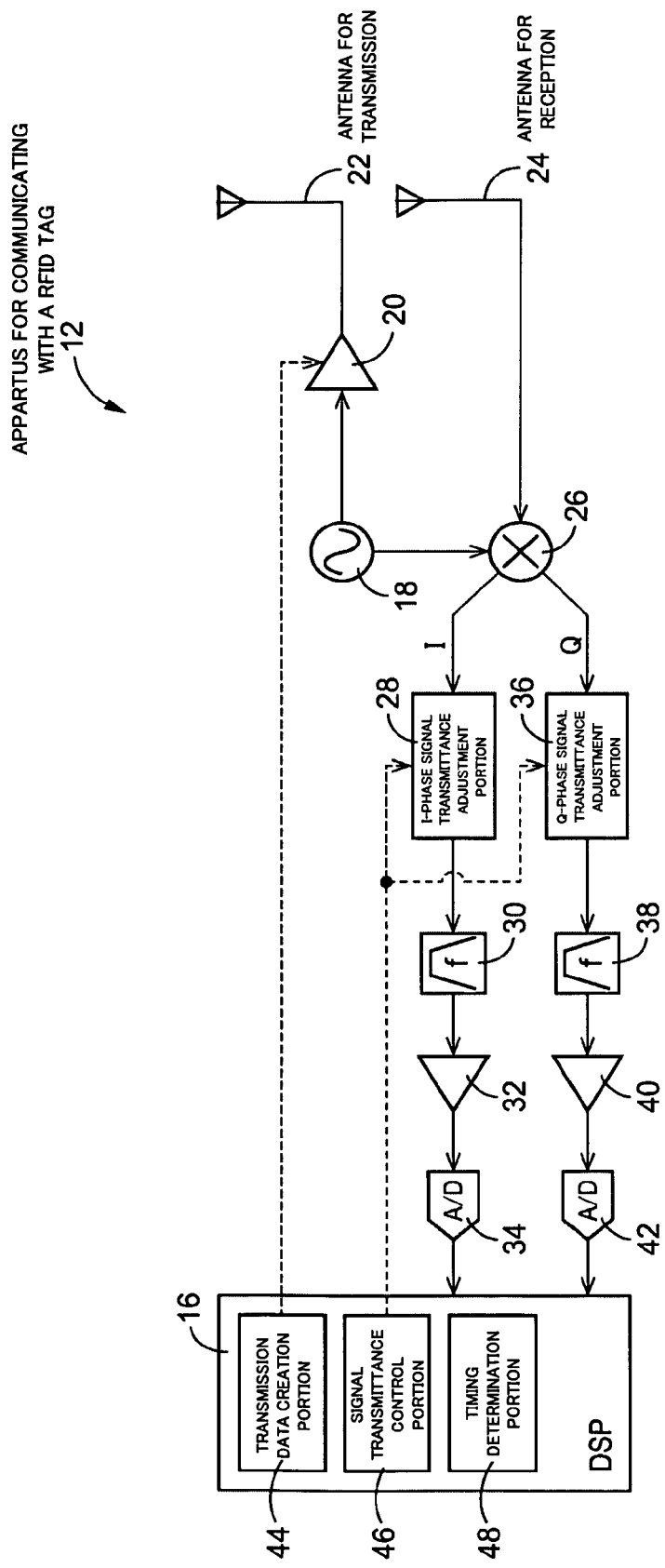
[FIG. 2]

[FIG. 3]
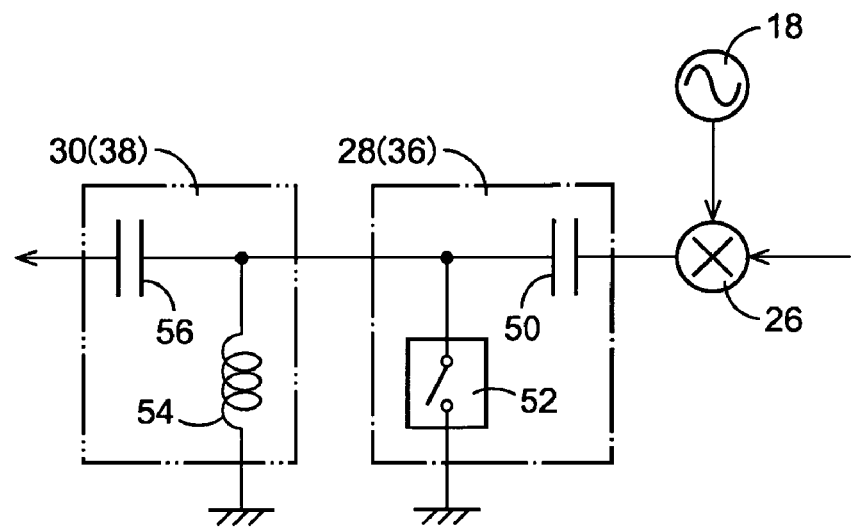

[FIG. 4]
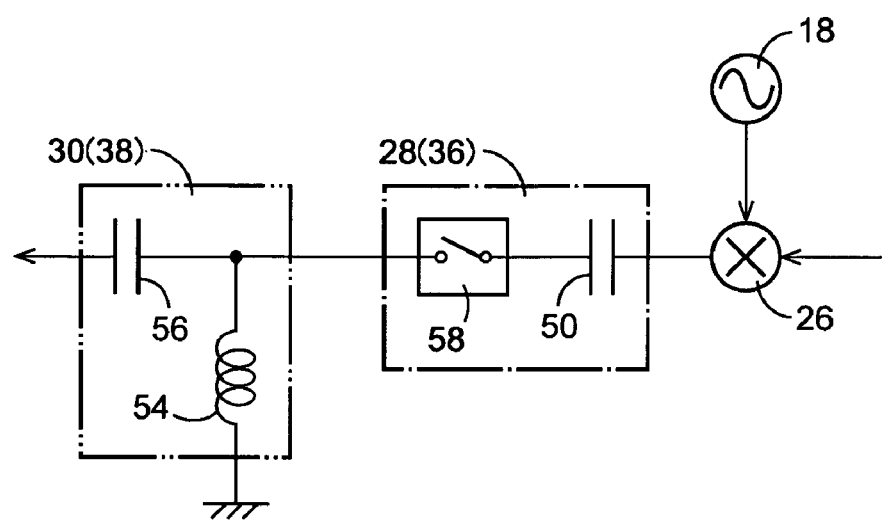

[FIG. 5]
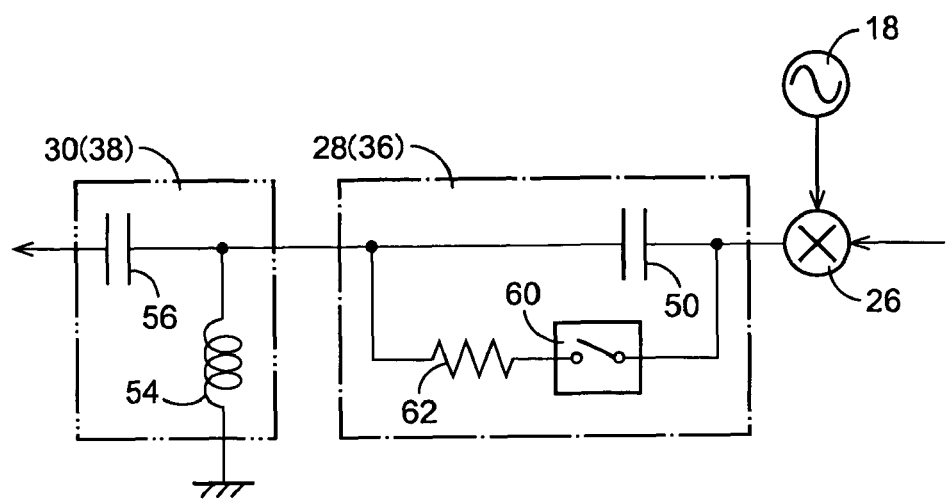

[FIG. 6]
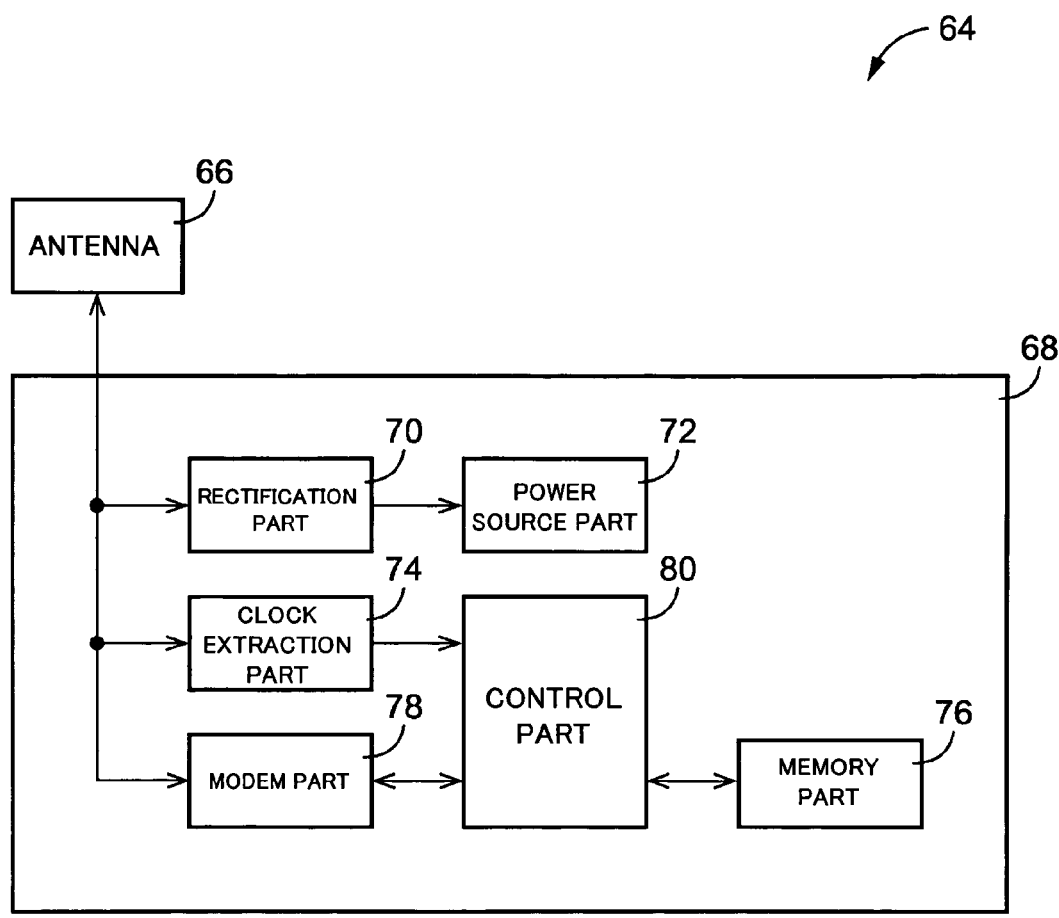

[FIG. 7]
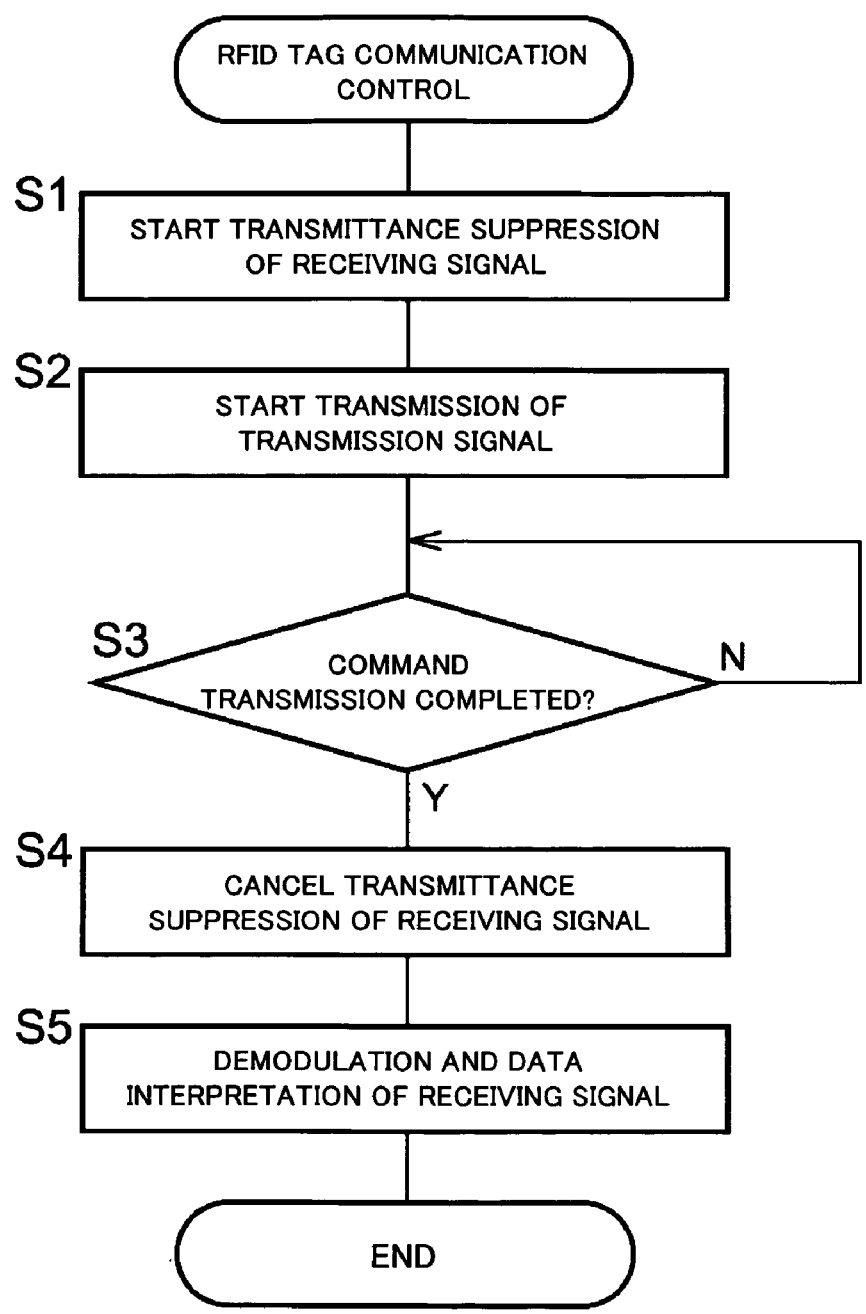

[FIG. 8]
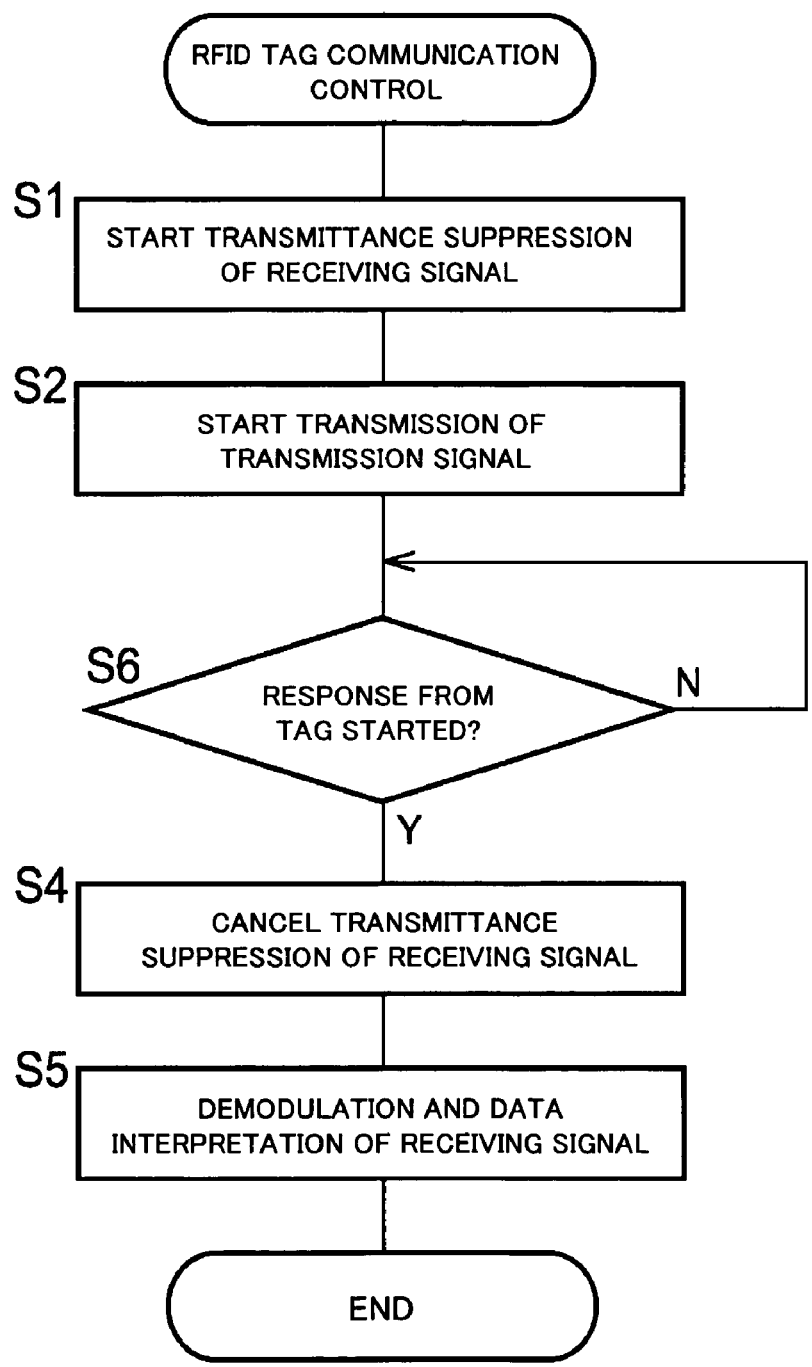

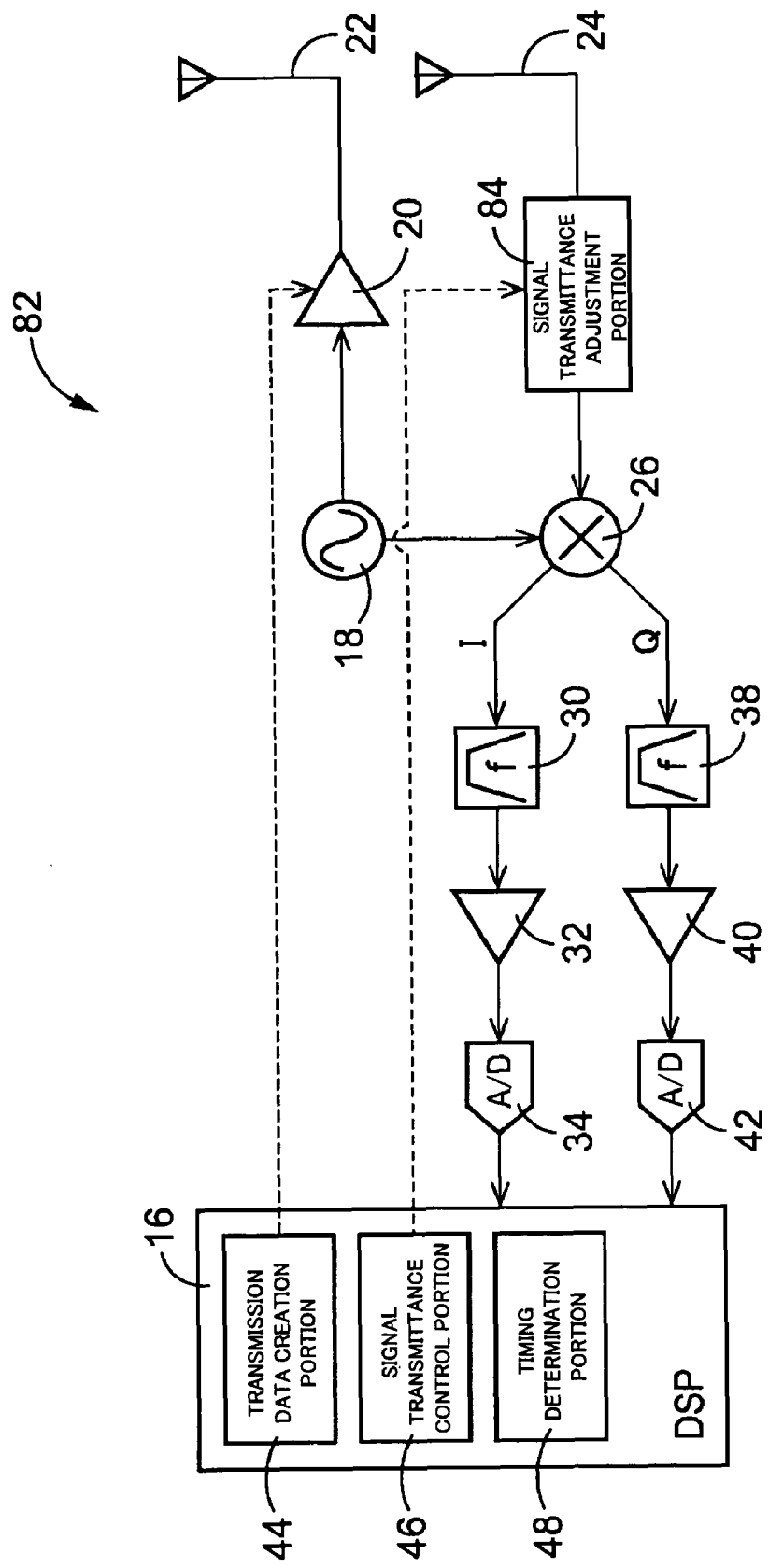
[FIG. 9]

[FIG. 10]
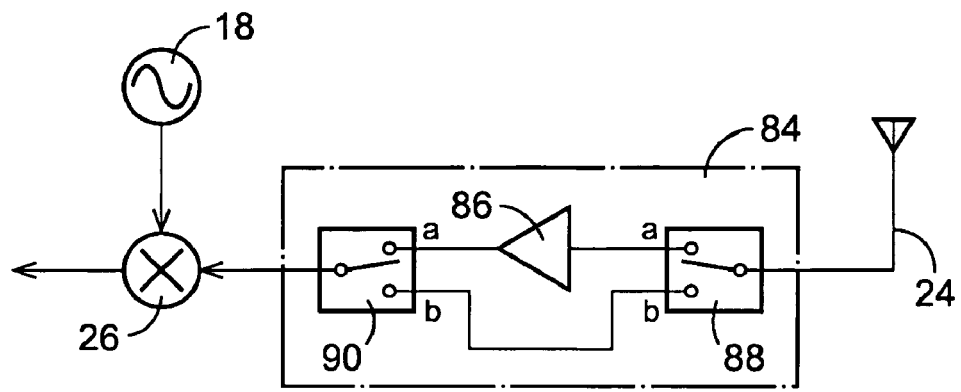

[FIG. 11]
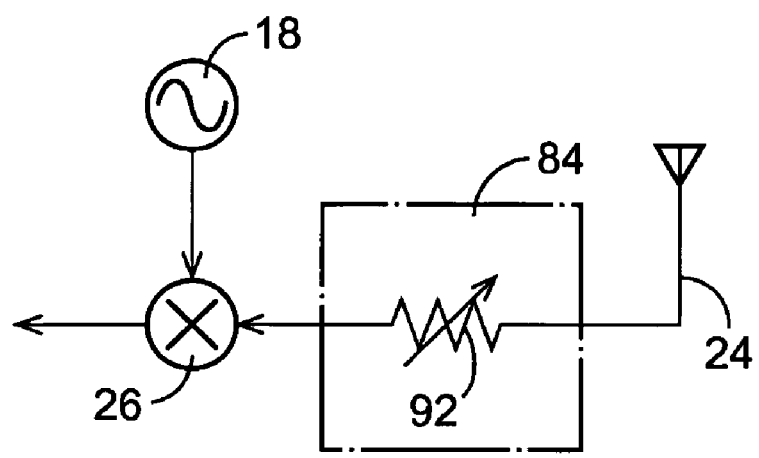

[FIG. 12]
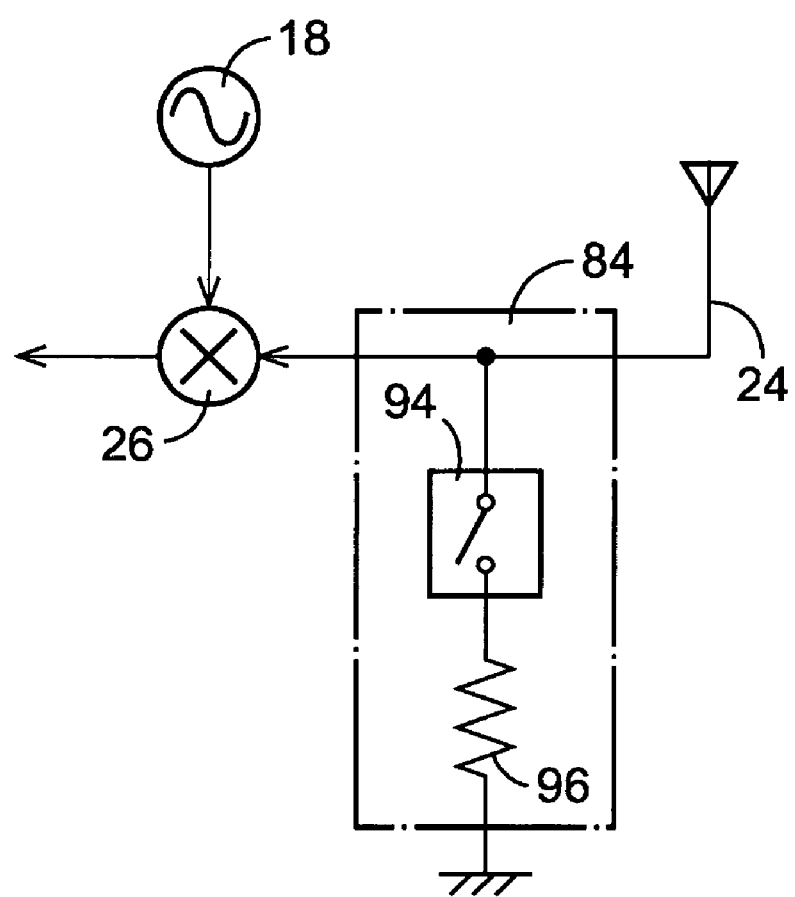

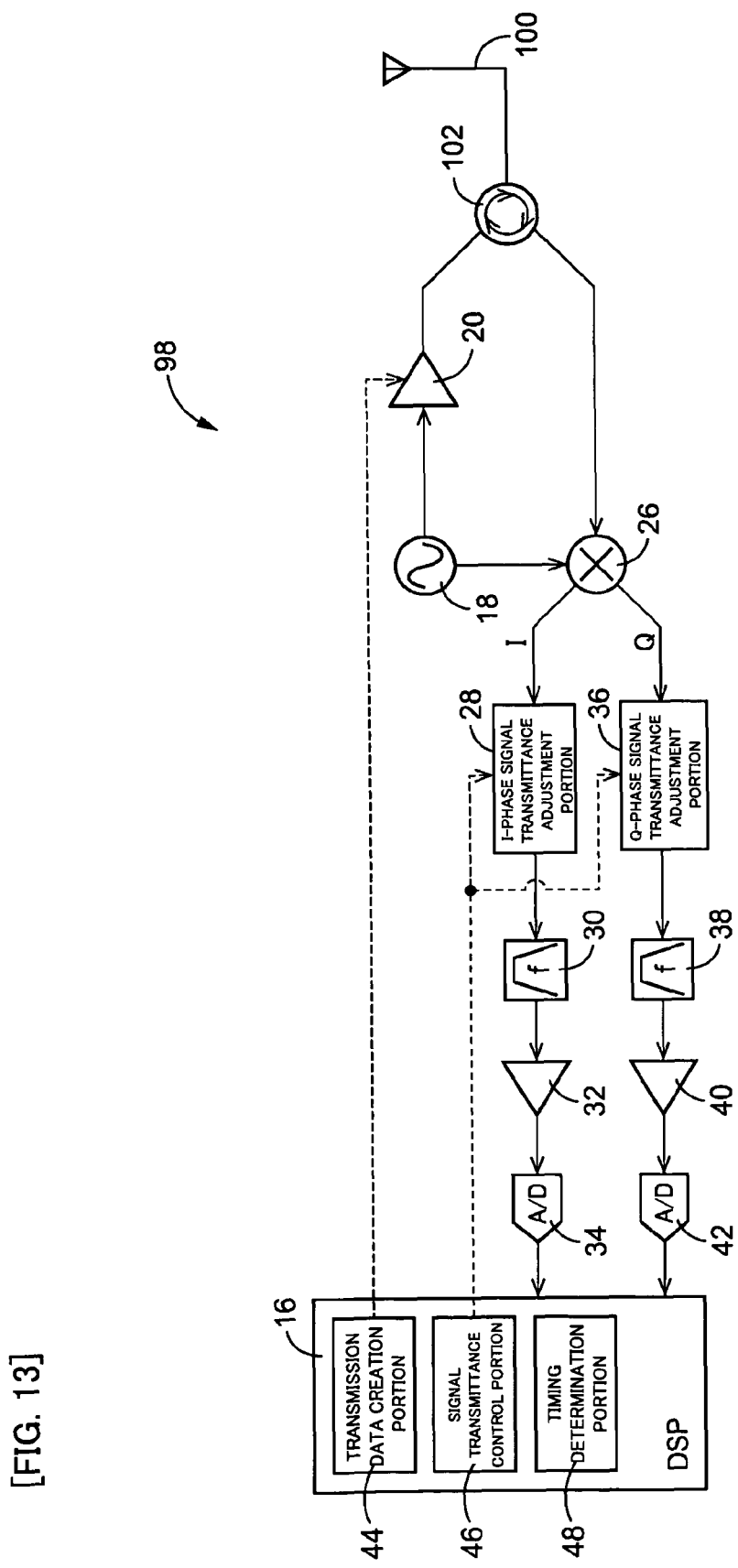
[FIG. 13]

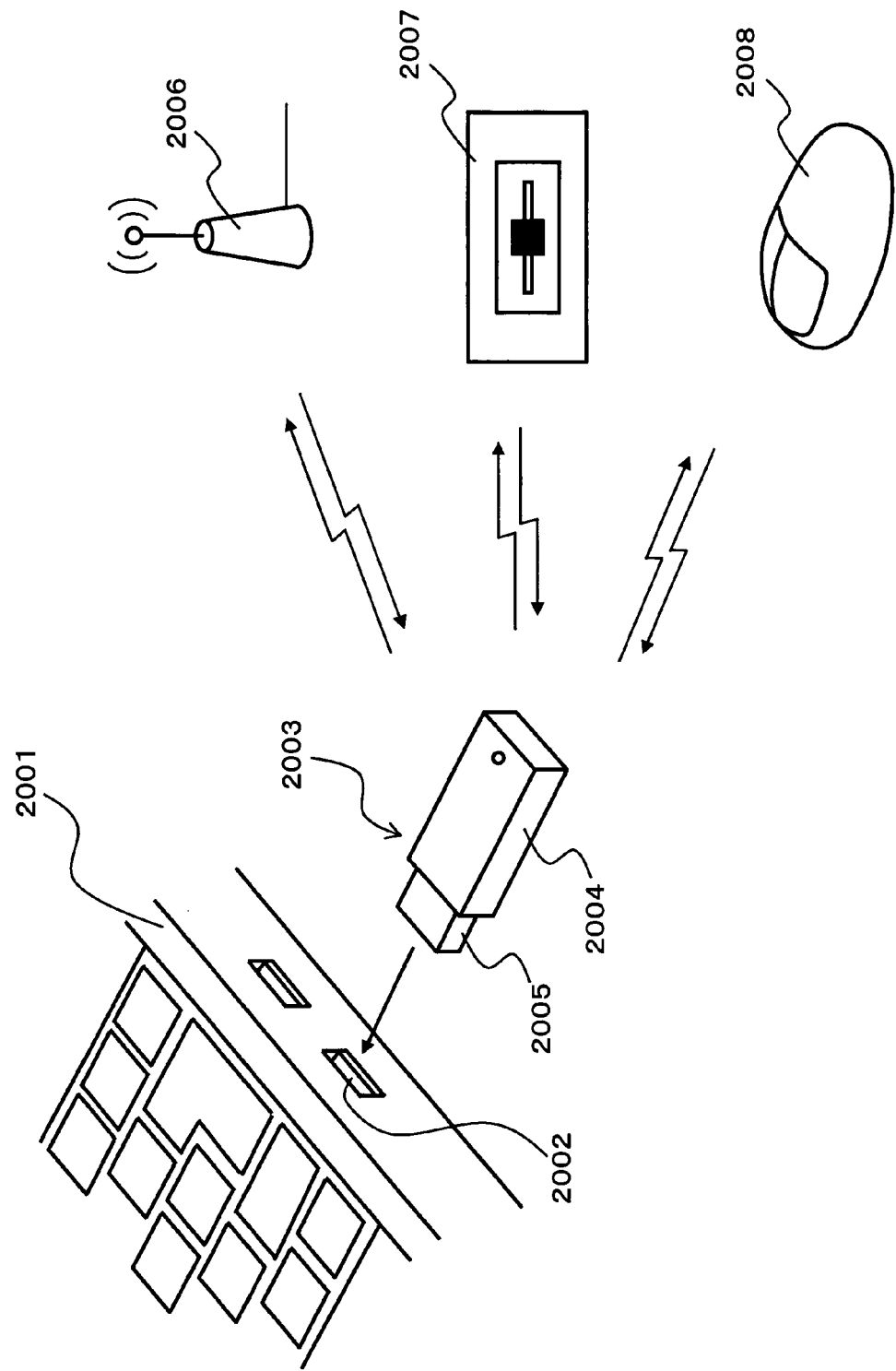
[FIG. 14]

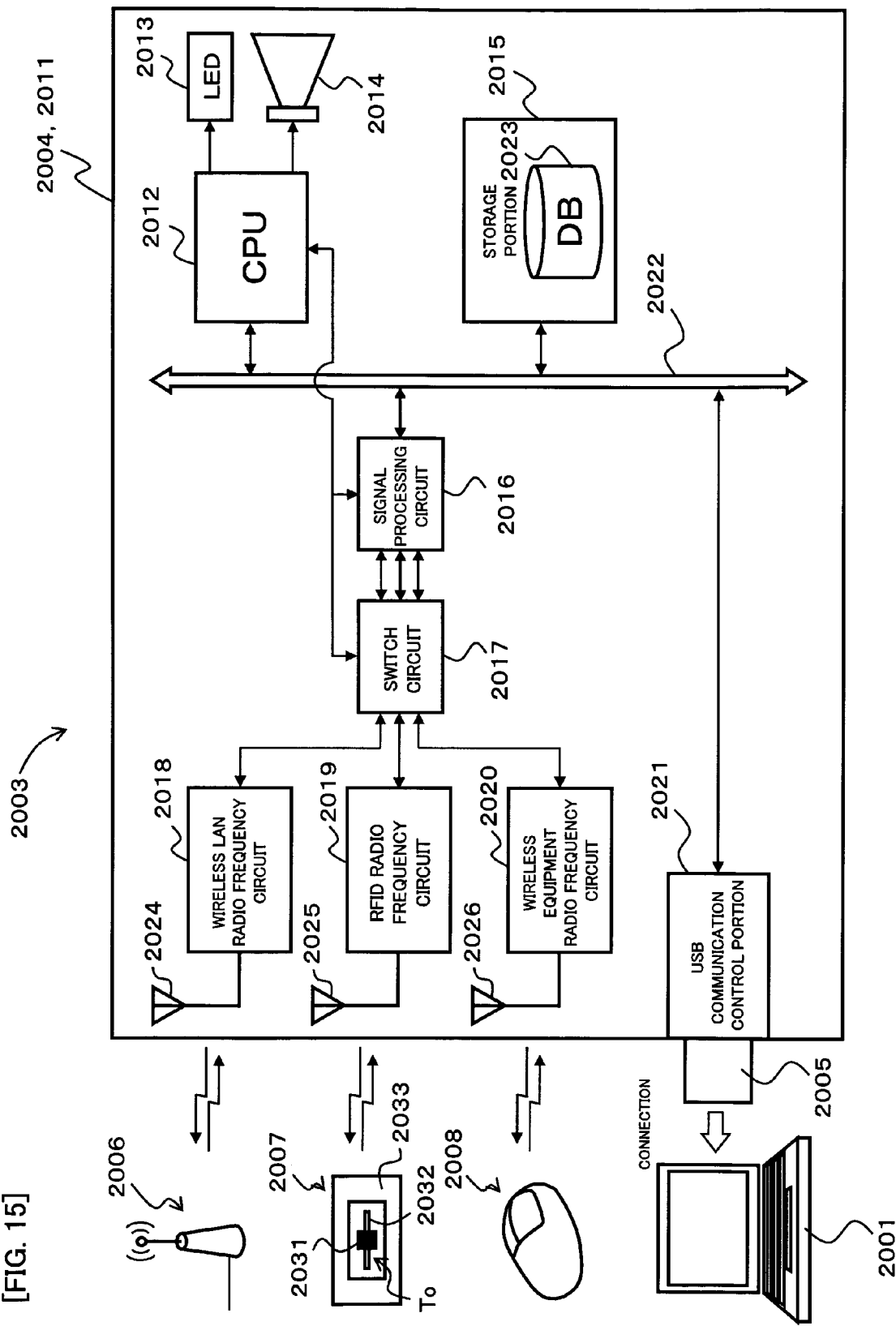
[FIG. 15]

[FIG. 16]
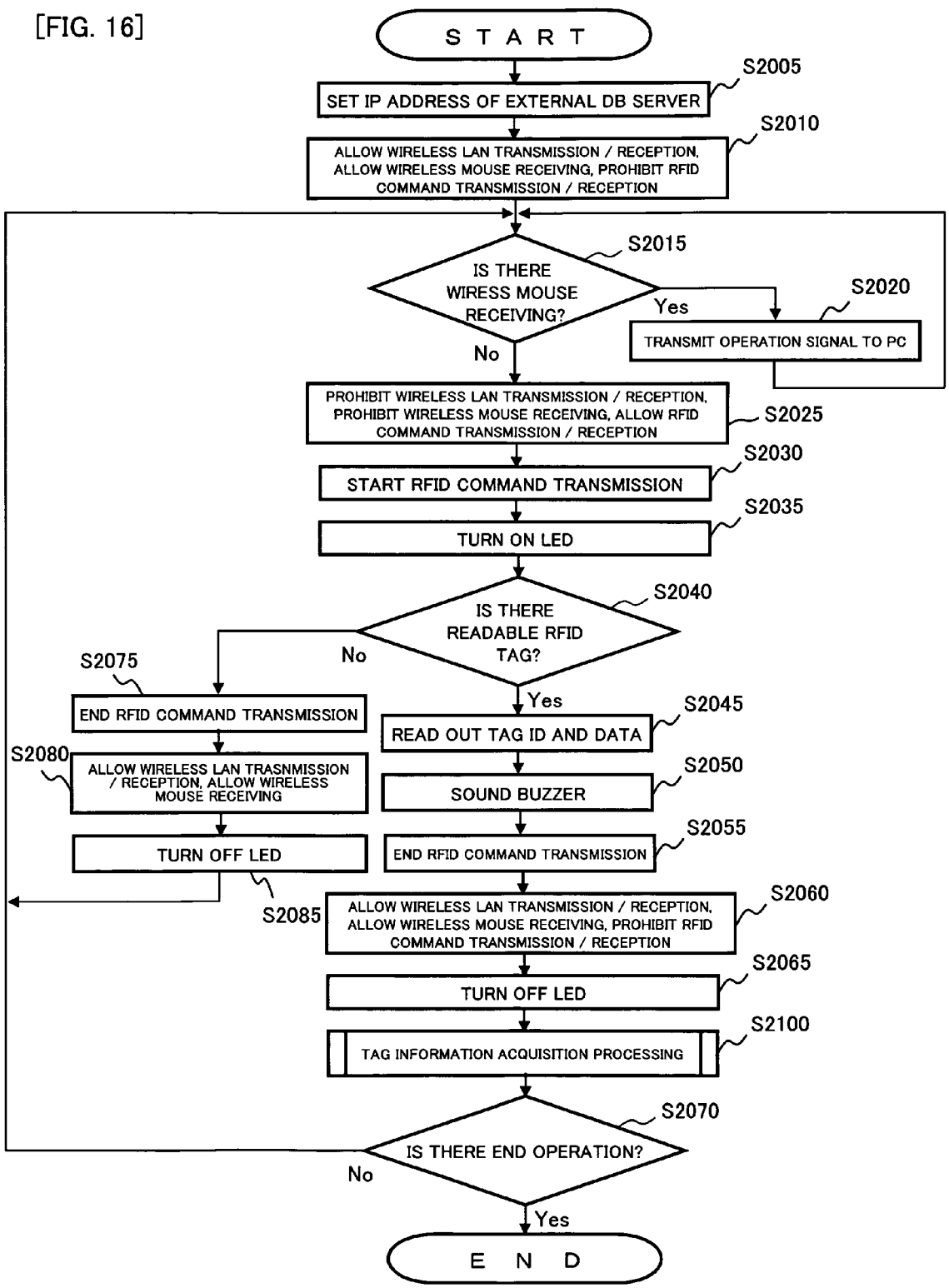

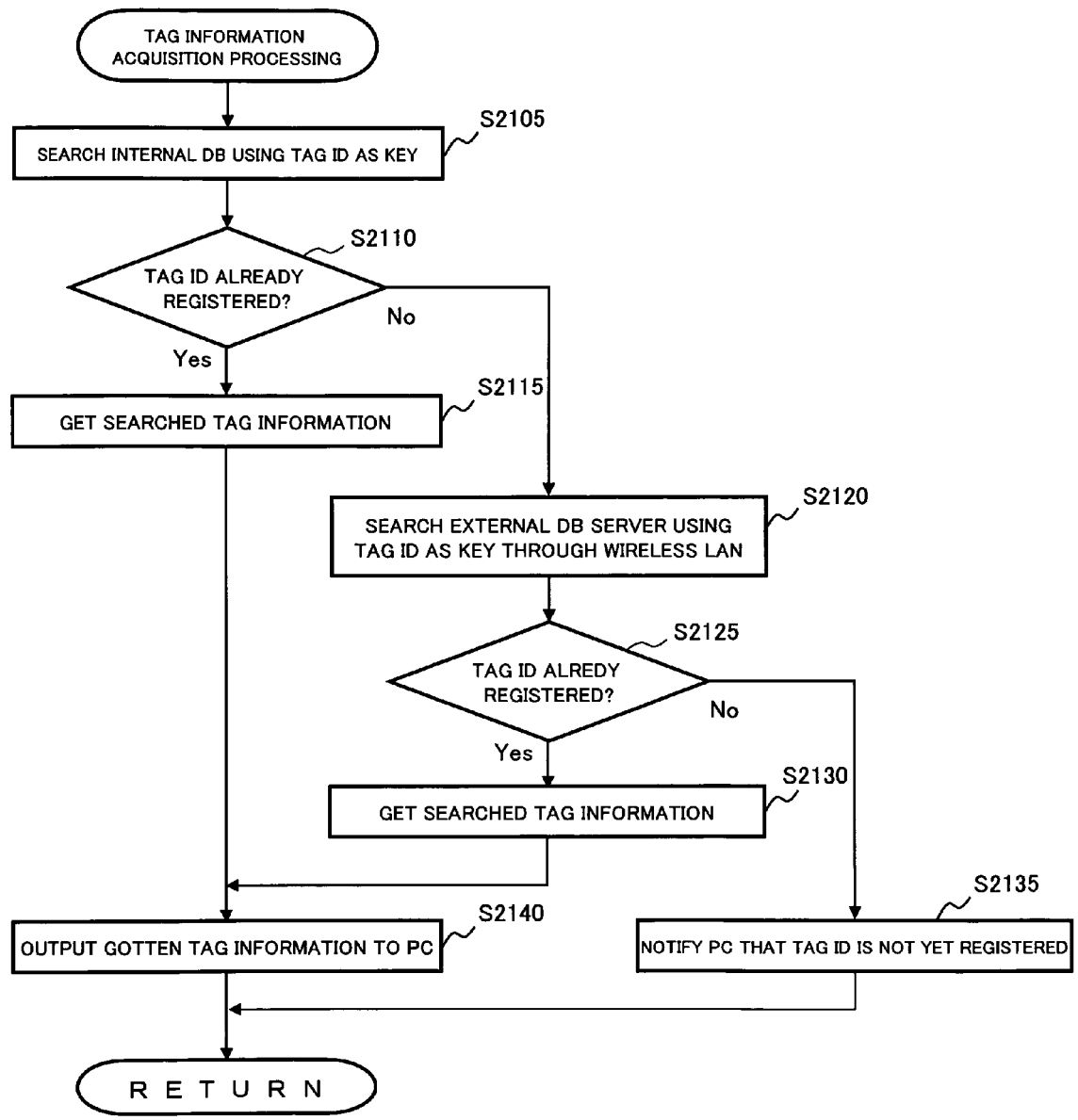

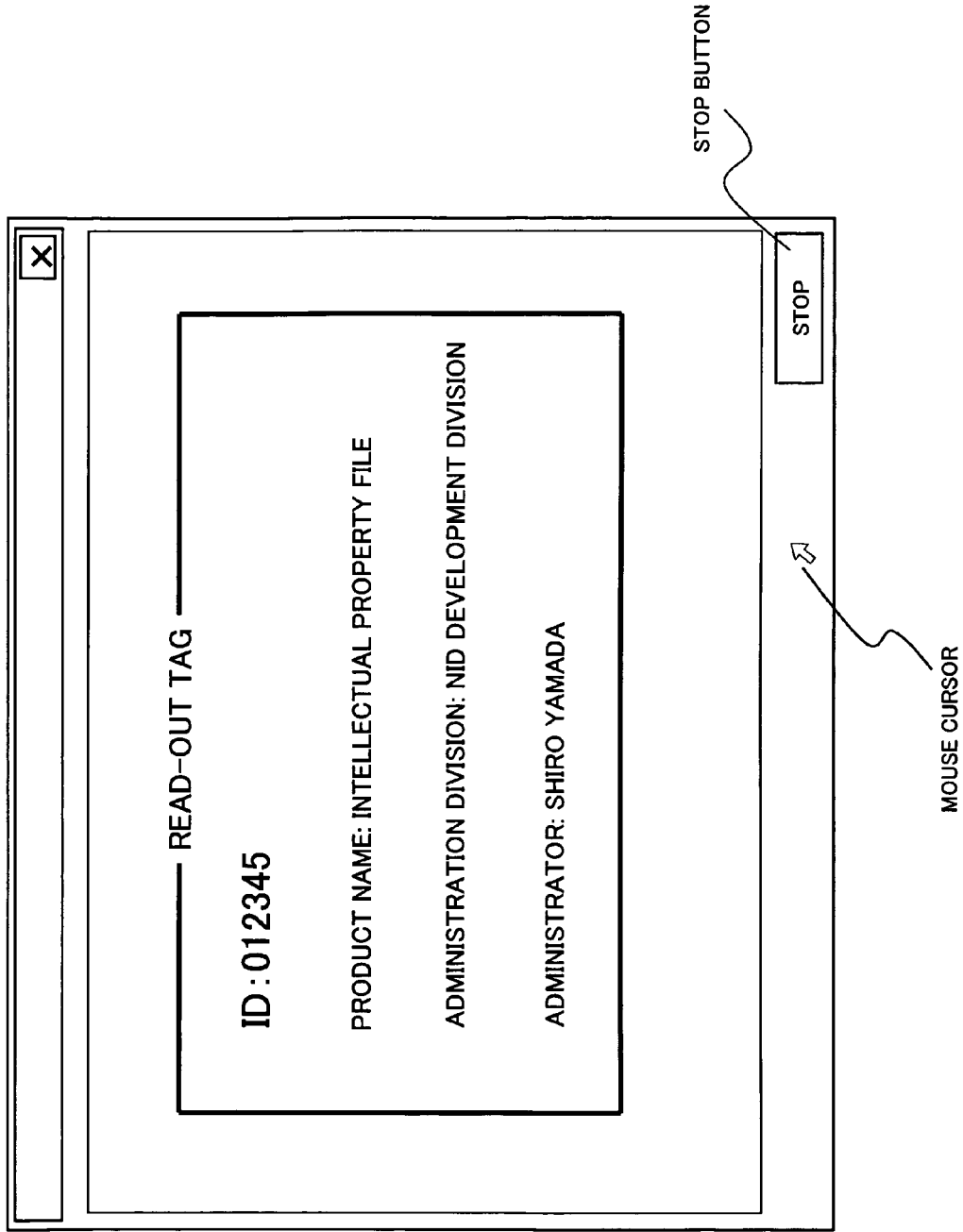
[FIG. 18]

SIGNAL PROCESSING UNIT

CROSS-REFERENCE TO RELATED APPLICATION

This is a CIP application PCT/JP2007/068726, filed Sep. 26, 2007, which was not published under PCT article 21(2) in English.

BACKGROUND OF THE INVENTION

1. Field of the Invention

The present invention relates to a signal processing unit configured to communicate with a RFID tag which can write in and read out information via radio communication.

2. Description of the Related Art

A RFID (Radio Frequency Identification) system configured to read out information from a small-sized RFID tag (responder) in which predetermined information is stored by a predetermined apparatus for communicating with a RFID tag (signal processing unit) contactlessly is known. Since this RFID system is capable of reading out the information stored in the RFID tag through communication with the apparatus for communicating with a RFID tag even if the RFID tag is stained or positioned in a hidden position, practical use in various fields such as merchandize control, inspection process and the like is expected.

As one of radio communication systems using a RFID tag which begins to be utilized in various fields as above, there is known an apparatus for communicating with a RFID tag configured to read out or write in information from/to a RFID circuit element (IC tag) via radio communication. In communication between this apparatus for communicating with a RFID tag and a RFID tag, there is a trouble in which favorable communication is obstructed by influence of transient response. Thus, an art to suppress such an influence of the transient response is proposed. For example, an interrogating machine for data carrier described in JP, A, 2001-53642 can be cited. According to this prior art, a signal waveform is received by a pseudo data carrier, the received signal waveform and a predetermined response waveform expected from transmission data are compared, and by applying feedback to a driving level of a transmission coil so that an error portion of the comparison result is modified, the influence of the transient response involving conversion of the signal from the interrogating machine can be reduced and favorable communication can be realized.

As another example of the apparatus for communicating with a RFID tag, for example, is also proposed as described in JP, A, 2006-79217. In this apparatus for communicating with a RFID tag, by transmitting an inquiry signal to a RFID circuit element and by receiving a response signal from the RFID circuit element present in a communication range, information reading or writing from/to the RFID circuit element is carried out. Also, this apparatus for communicating with a RFID tag is connected to a server through a network, and by accessing the server through the network using information (code information) read out of the RFID circuit element as a key, information of an article (target object) to which the RFID circuit element is attached is gotten.

As an influence of the transient response of a transmission modulation wave in the communication with a RFID tag by an apparatus for communicating with a RFID tag, a modulation degree of a transmission signal (interrogation wave) transmitted from the apparatus for communicating with a RFID tag is larger than that of a reply signal (response wave) returned from the RFID tag, and since a transient response period is overlapped with a return period of the reply signal from the RFID tag, a head portion of the reply signal is crushed by a wrap around signal from the transmission side, which is a trouble. In this case, in order to prevent the overlapping of the above periods, with regard to the signal by the transient response and the reply signal from the RFID tag, by processing one of them with priority while by suppressing the other processing, the overlapping should be able to be prevented. However, with the prior art described in the JP, A, 2001-53642, such consideration is not given and the trouble due to the influence of the transient response could not be solved. Thus, smooth communication has been prevented.

On the other hand, in the prior art described in the JP, A, 2006-79217, when a system is to be constructed, there is a need to newly install an apparatus for communicating with a RFID tag capable of network connection apart from an existing information terminal such as a personal computer. Particularly, if the network connection is to be made by radio communication, radio wave interference is caused by co-presence of the radio communication for the network and the radio communication with the RFID tag and smooth communication is prevented.

SUMMARY OF THE INVENTION

A first object of the present invention is to provide a signal processing unit that can execute smooth communication by setting priority among a plurality of communication processings.

A second object of the present invention is to provide a signal processing unit that can suppress the influence of the transient response.

A third object of the present invention is to provide a signal processing unit that can easily realize an apparatus for communicating with a RFID tag capable of network connection and can prevent radio wave interference only by being attached to a usual information terminal.

BRIEF DESCRIPTION OF THE DRAWING

FIG. 1 is a diagram for illustrating a RFID tag communication system to which the present invention is suitably applied.

FIG. 2 is a diagram for illustrating a configuration of an apparatus for communicating with a RFID tag, which is a first embodiment of a signal processing unit of the present invention.

FIG. 3 is a diagram for illustrating an example of configuration of a signal transmittance adjustment device provided at the apparatus for communicating with a RFID tag in FIG. 2.

FIG. 4 is a diagram for illustrating another example of configuration of the signal transmittance adjustment device provided at the apparatus for communicating with a RFID tag in FIG. 2.

FIG. 5 is a diagram for illustrating still another example of configuration of the signal transmittance adjustment device provided at the apparatus for communicating with a RFID tag in FIG. 2.

FIG. 6 is a diagram for illustrating a configuration of a RFID circuit element provided at a RFID tag as a communication target of the apparatus for communicating with a RFID tag in FIG. 2.

FIG. 7 is a flowchart for illustrating an essential part of a RFID tag communication control by a DSP of the apparatus for communicating with a RFID tag in FIG. 2.

FIG. 8 is a flowchart for illustrating an essential part of another example of the RFID tag communication control by a DSP of the apparatus for communicating with a RFID tag in FIG. 2.

FIG. 9 is a diagram for illustrating a configuration of an apparatus for communicating with a RFID tag, which is a second embodiment of the signal processing unit of the present invention.

FIG. 10 is a diagram for illustrating an example of configuration of a signal transmittance adjustment device provided at the apparatus for communicating with a RFID tag in FIG. 9.

FIG. 11 is a diagram for illustrating another example of configuration of the signal transmittance adjustment device provided at the apparatus for communicating with a RFID tag in FIG. 9.

FIG. 12 is a diagram for illustrating still another example of configuration of the signal transmittance adjustment device provided at the apparatus for communicating with a RFID tag in FIG. 9.

FIG. 13 is a diagram for illustrating a configuration of an apparatus for communicating with a RFID tag, which is a third embodiment of the signal processing unit of the present invention.

FIG. 14 is a perspective view illustrating a connector radio device, which is a fourth embodiment of the signal processing unit of the present invention, and an appearance of a laptop computer to which this is attached.

FIG. 15 is a system configuration diagram of the connector radio device.

FIG. 16 is a flowchart illustrating a control procedure executed by a CPU of the connector radio device.

FIG. 17 is a flowchart illustrating a detailed procedure of Step S2100 in FIG. 16.

FIG. 18 is a diagram illustrating an example of a display screen of the laptop computer.

DETAILED DESCRIPTION OF THE PREFERRED EMBODIMENTS

An embodiment of the present invention will be described below in detail based on the attached drawings.

A first embodiment of the present invention will be described referring to FIGS. 1 to 8. This embodiment is an embodiment configured to suppress an influence of transient response.

FIG. 1 is a diagram for illustrating a RFID tag communication system 10 to which the present invention is favorably applied. The RFID tag communication system 10 is a so-called RFID (Radio Frequency Identification) system configured by an apparatus 12 for communicating with a RFID tag, which is an embodiment of a signal processing unit of the present invention and a single or a plurality of (single in FIG. 1) RFID tags 14, which is a communication target of the apparatus 12 for communicating with a RFID tag, and the apparatus 12 for communicating with a RFID tag functions as an interrogator of the RFID system and the RFID tag 14 as a responder, respectively. That is, when an interrogation wave Fc (transmission signal) is transmitted from the apparatus 12 for communicating with a RFID tag to the RFID tag 14, in the RFID tag 14 which received the interrogation wave Fc, a response wave Fr (reply signal) modulated by a predetermined command (transmission data) is returned to the apparatus 12 for communicating with a RFID tag so that information is communicated between the apparatus 12 for communicating with a RFID tag and the RFID tag 14. The RFID tag communication system 10 is used for management of an article in a predetermined communication region and the like, for example, while the RFID tag 14 is integrally provided at the article by being affixed to the article to be managed and the like.

FIG. 2 is a diagram for illustrating a configuration of the apparatus 12 for communicating with a RFID tag. As shown in FIG. 2, the apparatus 12 for communicating with a RFID tag of this embodiment communicates information with the RFID tag 14 for executing reading/writing of the information with respect to the RFID tag 14, direction detection of the RFID tag 14 and the like and comprises a DSP (Digital Signal Processor) 16 configured to execute digital signal processing such as output of transmission data as a digital signal, demodulation of a reply signal from the RFID tag 14 and the like, a carrier wave creation portion 18 configured to generate a carrier wave of the transmission signal, a transmission amplifier 20 configured to output the carrier wave output from the carrier wave creation portion 18 with transmission data supplied from the DSP 16 added, an antenna for transmission 22 (antenna device) configured to transmit the signal supplied from the transmission amplifier 20 as the interrogation wave Fc, an antenna for reception 24 (antenna device) configured to receive a response wave Fr from the RFID tag 14, a homodyne detection portion 26 configured to carry out homodyne detection of the receiving signal received from the antenna for reception 24 on the basis of the carrier wave supplied from the carrier wave creation portion 18, an I-phase signal transmittance adjustment device 28 (signal transmittance adjustment device, priority control portion) that can suppress transmittance of an I-phase signal (in-phase component) output from the homodyne detection portion 26, an I-phase bandpass filter 30 configured to pass only a signal of a predetermined frequency band in the signal output from the I-phase signal transmittance adjustment device 28, an I-phase amplification portion 32 configured to amplify the signal supplied from the I-phase bandpass filter 30, an I-phase A/D conversion portion 34 configured to convert the signal supplied from the I-phase amplification portion 32 to a digital signal and to supply it to the DSP 16, a Q-phase signal transmittance adjustment device 36 (signal transmittance adjustment device, priority control portion) that can suppress transmittance of a Q-phase signal (orthogonal component) output from the homodyne detection portion 26, a Q-phase bandpass filter 38 configured to pass only a signal of a predetermined frequency band in the signal output from the Q-phase signal transmittance adjustment device 36, a Q-phase amplification portion 40 configured to amplify the signal supplied from the Q-phase bandpass filter 38, and a Q-phase A/D conversion portion 42 configured to convert the signal supplied from the Q-phase amplification portion 40 to a digital signal and to supply it to the DSP 16. Here, the carrier wave creation portion 18 and the transmission amplifier 20 correspond to a signal processing unit and the homodyne detection portion 26 corresponds to a second receiving processing device, respectively.

The DSP 16 includes a CPU as a central processing unit, a ROM as a read-only memory, and a RAM as a random access memory and the like and is a so-called microcomputer system configured to perform signal processing according to a program stored in the ROM in advance while using a temporary storage function of the RAM and functionally includes a transmission data creation portion 44, a signal transmittance control device 46, and a timing determination device 48. These control functions will be described later.

FIG. 3 is a diagram for illustrating a configuration common to the I-phase signal transmittance adjustment device 28 and the Q-phase signal transmittance adjustment device 36. If the I-phase signal transmittance adjustment device 28 and the Q-phase signal transmittance adjustment device 36 are not particularly distinguished from each other in the following, they are simply referred to as signal transmittance adjustment devices 28, 36. As shown in FIG. 3, the signal transmittance adjustment devices 28, 36 are provided with a capacitor 50 configured to remove a direct-current component of a signal in a signal transmittance path from the homodyne detection portion 26 to the I-phase bandpass filter 30 or the Q-phase bandpass filter 38 (hereinafter if not particularly distinguished, they are merely referred to as bandpass filters 30, 38), for example, and includes a switch portion 52 configured to suppress transmittance of a signal by directly or indirectly through a resistance and the like grounding a signal transmittance path between the capacitor 50 and the bandpass filters 30, 38. The signal transmittance adjustment devices 28, 36 suppress signal transmittance or cancel the suppression of signal transmittance from the homodyne detection portion 26 to the bandpass filters 30, 38 through opening/closing control of the switch portion 52 on the basis of a command from the signal transmittance control device 46, which will be described later. That is, when the switch portion 52 is connected (closed), the signal transmittance path between the capacitor 50 and the bandpass filters 30, 38 is grounded and the signal transmittance in the signal transmittance path is suppressed, while when the switch portion 52 is opened (open), the suppression of the signal transmittance from the capacitor 50 to the bandpass filters 30, 38 is cancelled. Also, the bandpass filters 30, 38 include a coil 54 and a capacitor 56 as shown in FIG. 3, for example.

FIG. 4 is a diagram for illustrating another mode of the signal transmittance adjustment device 28, 36. As shown in FIG. 4, the signal transmittance adjustment device 28, 36 includes the capacitor 50 in the signal transmittance path and may include a switch portion 58 configured to suppress the transmittance of the signal by cutting off the signal transmittance path between the capacitor 50 and the bandpass filters 30, 38. In such a signal transmittance adjustment device 28, 36, when the switch portion 58 is opened (open) according to the command from the signal transmittance control device 46, which will be described later, the signal transmittance path between the capacitor 50 and the banspass filters 30, 38 is cut off and the signal transmittance in the signal transmittance path is suppressed, while when the switch portion 58 is connected (closed), the suppression of the signal transmittance from the capacitor 50 to the bandpass filters 30, 38 is cancelled.

FIG. 5 is a diagram for illustrating still another mode of the signal transmittance adjustment devices 28, 36. As shown in FIG. 5, the signal transmittance adjustment device 28, 36 includes the capacitor 50 in the signal transmittance path and may include a switch portion 60 and a resistor 62 configured to suppress signal transmittance by directly or indirectly short-circuiting both electrodes of the capacitor 50. In such a signal transmittance adjustment device 28, 36, when the switch portion 60 is connected (closed) according to the command from the signal transmittance control device 46, which will be described later, the both electrodes of the capacitor 50 are short-circuited and the signal transmittance in the signal transmittance path is suppressed, while when the switch portion 60 is opened (open), the suppression of the signal transmittance from the capacitor 50 to the bandpass filters 30, 38 is cancelled.

FIG. 6 is a diagram for illustrating a configuration of a RFID circuit element 64 provided at the RFID tag 14. As shown in FIG. 6, the RFID circuit element 64 includes an antenna part 66 configured to carry out transmission/reception of a signal with the apparatus 12 for communicating with a RFID tag and an IC circuit part 68 configured to process the signal received by the antenna part 66. The IC circuit part 68 functionally includes a rectification part 70 that rectifies an interrogation wave Fc from the apparatus 12 for communicating with a RFID tag and received by the antenna part 66, a power source part 72 that accumulates energy of the interrogation wave Fc rectified by the rectification part 70, a clock extraction part 74 that extracts a clock signal from the carrier wave received by the antenna part 66 so as to supply it to a control part 80, a memory part 76 functioning as an information storage portion that can store a predetermined information signal, a modem part 78 connected to the antenna part 66 for signal modulation and demodulation, and the control part 80 that controls operation of the RFID circuit element 64 through the rectification part 70, the clock extraction part 74, the modem part 78 and the like. The control part 80 executes basic control such as control to store the predetermined information in the memory part 76 via communication with the apparatus 12 for communicating with a RFID tag, control to return a response wave Fr modulated on the basis of the information signal stored in the memory part 76 in the modem part 78 from the antenna part 66 and the like.

Returning to FIG. 2, the transmission data creation portion 44 provided at the DSP 16 of the apparatus 12 for communicating with a RFID tag creates the transmission data as a modulation signal in the transmission amplifier 20 and supplies it to the transmission amplifier 20. The transmission data here is a predetermined command bit string and the like, for example, and the transmission amplifier 20 adds the transmission data supplied from the transmission data creation part 44 to the carrier wave supplied from the carrier wave creation part 18 and transmits it from the antenna for transmission 22 toward the RFID tag 14.

The signal transmittance control part 46 (signal transmittance control device, priority control portion) controls transmittance of the receiving signal from the antenna for reception 24 to the DSP 16 as receiving processing device through the I-phase signal transmittance adjustment device 28 and the Q-phase signal transmittance adjustment device 36. Specifically, at least while a transmission signal including a modulation signal (transmission data) is being transmitted from the antenna for transmission 22, in other words, while the transmission data is being supplied from the antenna for transmission 22 to the transmission amplifier 20, the I-phase signal transmittance adjustment device 28 and the Q-phase signal transmittance adjustment device 36 are controlled so that the transmission of the receiving signal from the antenna for reception 24 to the DSP 16 is suppressed.

The timing determination device 48 (timing determination device) determines if a response on the basis of the modulation signal (transmission data) is started from the RFID tag 14 according to the transmission signal transmitted from the antenna for transmission 22 or not. Since time till the response on the basis of the transmission data included in the transmission signal is started from receiving by the RFID tag 14 of the transmission signal is known in advance, the timing determination device 48 preferably determines if the response on the basis of the modulation signal is started from the RFID tag 14 based on whether a predetermined time has elapsed since the transmission signal including the modulation signal is transmitted from the antenna for transmission 22 or not.

Here, the signal transmittance control device 46 preferably controls the I-phase signal transmittance adjustment device 28 and the Q-phase signal transmittance adjustment device 36 so that the transmittance of the receiving signal from the antenna for reception 24 to the DSP 16 is suppressed as long as the determination by the timing determination device 48 is denied, while if the determination by the timing determination device 48 is affirmed, the signal transmittance control device 46 controls the I-phase signal transmittance adjustment device 28 and the Q-phase signal transmittance adjustment device 36 so that the suppression of the transmittance of the receiving signal from the antenna for reception 24 to the DSP 16 is cancelled.

FIG. 7 is a flowchart for illustrating essential parts of the RFID tag communication control by the DSP 16 in the apparatus 12 for communicating with a RFID tag and repeatedly executed in a predetermined cycle.

First, at Step (hereinafter the term Step will be omitted) S1, the signal transmittance adjustment device 28, 36 is brought into a state to suppress the transmission of the receiving signal from the antenna for reception 24 to the DSP 16, and the transmittance suppression of the receiving signal is started. Subsequently, at S2, the transmission data (command) is supplied from the transmission data creation portion 44 to the transmission amplifier 20, and the transmission of the transmission signal from the antenna for transmission 22 to the RFID tag 14 is started. Subsequently, at S3, it is determined if the command transmission, that is, the transmission of the transmission signal including the transmission data toward the RFID tag 14 has been finished or not. As long as the determination at S3 is denied, the determination at S3 is repeated and stand-by continues, but if the determination at S3 is affirmed, it is determined at S4 that the signal transmittance adjustment device 28, 36 is in a state not to suppress the transmittance of the receiving signal from the antenna for reception 24 to the DSP 16, and the transmittance suppression of the receiving signal is cancelled. Subsequently, at S5, the reply signal from the RFID tag 14 is received by the antenna for reception 24, the receiving signal is detected by the homodyne detection portion 26, and after data interpretation of the receiving signal is carried out at the DSP 16, the routine is finished. In the above control, S1 and S4 correspond to the operation of the signal transmittance control device 46.

FIG. 8 is a flowchart for illustrating essential parts of another example of the RFID tag communication control by the DSP 16 in the apparatus 12 for communicating with a RFID tag, which is repeatedly executed in a predetermined cycle. In this control, the same reference numerals are given to the steps common to those in the above-mentioned control in FIG. 7 and the description will be omitted. In this control, subsequent to the processing in the above-mentioned S2, at S6 corresponding to the operation of the timing determination device 48, it is determined if the response on the basis of the modulation signal is started from the RFID tag 14 or not. As long as the determination at S6 is denied, the determination at S6 is repeated and stand-by continues, but if the determination at S6 is affirmed, the above-mentioned processing at S4 and after is executed. The stand-by time at S6 should be shorter than time till the RFID tag 14 starts a response on the basis of the transmission data included in the transmission signal from the start of transmission of the transmission signal in order to surely receive all the response data of the RFID tag 14.

As mentioned above, according to this embodiment, since the signal transmittance adjustment devices 28, 36 that can suppress the transmittance of the receiving signal from the antenna for reception 24 to the DSP 16 as the receiving processing device and the signal transmittance control device 46 (S1 and S4) that controls the signal transmittance adjustment devices 28, 36 so that the transmittance of the receiving signal from the antenna for reception 24 to the DSP 16 is suppressed at least while the transmission signal including the modulation signal is transmitted from the antenna for transmission 22 are provided, occurrence of the trouble in which the head portion of the reply signal is crushed by the wrap around signal from the transmission side can be suitably prevented and particularly, favorable communication can be realized at the start of response from the RFID tag 14. That is, the influence of the transient response can be suitably suppressed. As a result, smooth communication can be executed.

Prior to the processing by the DSP 16, the homodyne detection portion 26 as the second receiving processing device that processes the receiving signal received by the antenna for reception 24 and supplies it to the DSP 16 is provided, and since the signal transmittance control device 46 is provided in the signal transmittance path between the homodyne detection portion 26 and the DSP 16, the influence of the transient response can be suitably suppressed in the apparatus 12 for communicating with a RFID tag provided with the configuration of the homodyne detection portion 26 as the second receiving processing device and the like.

Also, the timing determination device 48 (S6) that determines if the response on the basis of the modulation signal is started from the RFID tag 14 or not is provided, and if the determination by the timing determination device 48 is affirmed, the signal transmittance control devices 28, 36 control the signal transmittance adjustment devices 28, 36 so that the suppression of the transmittance of the receiving signal from the antenna for reception 24 to the DSP 16 is cancelled, and the suppression of the transmittance of the receiving signal is cancelled after the start of the response from the RFID tag 14, and suitable communication can be realized with the RFID tag 14.

Also, since the signal transmittance adjustment device 28, 36 includes the capacitor 50 that removes a direct current component in the receiving signal in the transmittance path of the receiving signal, the direct current component of the receiving signal can be suitably removed, and the suitable communication can be realized with the RFID tag 14.

Also, since the signal transmittance adjustment devices 28, 36 suppress the transmittance of the receiving signal by grounding the transmittance path of the receiving signal, the transmittance of the receiving signal can be suppressed in a practical mode.

Also, since the signal transmittance adjustment devices 28, 36 suppress the transmittance of the receiving signal by cutting off the transmittance path of the receiving signal, the transmittance of the receiving signal can be suppressed in a practical mode.

Also, since the signal transmittance adjustment devices 28, 36 suppress the transmittance of the receiving signal by short-circuiting the both electrodes of the capacitor 50, the transmittance of the receiving signal can be suppressed in a practical mode.

Also, since the antenna for transmission 22 and the antenna for reception 24 are provided individually, in the apparatus 12 for communicating with a RFID tag provided with the antenna for transmission 22 and the antenna for reception 24 individually, the influence of the transient response can be suitably suppressed.

Subsequently, a second embodiment of the present invention will be described in detail on the basis of the attached drawings. In the following description, the same reference numerals are given to the portions common to the embodiments, and the description thereof will be omitted.

FIG. 9 is a diagram for illustrating a configuration of an apparatus 82 for communicating with a RFID tag (signal processing unit), which is the second embodiment of the present invention. As shown in FIG. 9, the apparatus 82 for communicating with a RFID tag of this embodiment includes a signal transmittance adjustment device 84 (signal transmittance adjustment device, priority control portion) that can suppress the transmittance of the receiving signal from the antenna for reception 24 to the homodyne detection portion 26 in the signal transmittance path between the antenna for reception 24 and the homodyne detection portion 26. Also, the signal transmittance control device 46 provided at the DSP 16 of the apparatus 82 for communicating with a RFID tag of this embodiment controls the transmittance of the receiving signal to a circuit on the downstream side of the homodyne detection portion 26 as the receiving processing device from the antenna for reception 24 through the signal transmittance adjustment device 84, that is, the receiving circuit such as the I-phase bandpass filter 30, the I-phase amplification portion 32, the I-phase A/D conversion portion 34, the Q-phase bandpass filter 38, Q-phase amplification portion 40, the Q-phase A/D conversion portion 42 or the DSP 16 and the like.

FIG. 10 is a diagram exemplifying a configuration of the signal transmittance adjustment device 84. As shown in FIG. 10, the signal transmittance adjustment device 84 includes an amplification portion 86 having a gain close to zero and includes a first switch portion 88 and a second switch portion 90 that switch between a circuit going through the amplification portion 86 and a circuit not going through the amplification portion 86. In such a signal transmittance adjustment device 84, when both of the first switch portion 88 and the second switch portion 90 are connected to a terminal a shown in FIG. 10 so as to establish a circuit going through the amplification portion 86 according to the command from the signal transmittance control device 46, the transmittance of the signal in the signal transmittance path between the antenna for reception 24 and the homodyne detection portion 26 is suppressed, while when both the first switch portion 88 and the second switch portion 90 are connected to a terminal b shown in FIG. 10 so as to establish a circuit not going through the amplification portion 86, the suppression of the signal transmittance from the antenna for reception 24 to the homodyne detection portion 26 is cancelled.

FIG. 11 is a diagram exemplifying another configuration of the signal transmittance adjustment device 84. The signal transmittance adjustment device 84 may include a variable attenuation portion 92 (variable attenuation device) in the transmittance path of the receiving signal so that the transmittance of the receiving signal is suppressed by varying an attenuation rate of the variable attenuation portion 92. In such a signal transmittance adjustment device 84, when the attenuation rate is raised in the variable attenuation portion 92 according to the command from the signal transmittance control device 46, the transmittance of the signal in the signal transmittance path between the antenna for reception 24 and the homodyne detection portion 26 is suppressed, while when the attenuation rate in the variable attenuation portion 92 is lowered, the transmittance suppression of the signal from the antenna for reception 24 to the homodyne detection portion 26 is cancelled. Also, the configuration provided with the variable attenuation portion 92 in the signal transmittance path is exemplified here, but as an alternative to the variable attenuation portion 92, there may be a mode in which a variable amplification portion (variable amplification device) is provided so that the transmittance of the signal in the signal transmittance path by bringing the gain of the variable amplification device close to zero. According to such configuration, since the signal transmittance adjustment device 84 includes the variable attenuation portion (variable amplification device) 92 in the transmittance path of the receiving signal so that the transmittance of the receiving signal is suppressed by changing the attenuation rate (gain) of the variable attenuation portion 92, the transmittance of the receiving signal can be suppressed in a practical mode.

FIG. 12 is a diagram exemplifying still another configuration of the signal transmittance adjustment device 84. As shown in FIG. 12, the signal transmittance adjustment device 84 may include a switch portion 94 configured to suppress the transmittance of the signal by indirectly grounding the signal transmittance path between the antenna for reception 24 and the homodyne detection portion 26 through a resistor 96. In such a signal transmittance adjustment device 84, when the switch portion 94 is connected (closed) according to the command from the signal transmittance control device 46, the signal transmittance path between the antenna for reception 24 and the homodyne detection portion 26 is grounded and the transmittance of the signal in the signal transmittance path is suppressed, while when the switch portion 94 is opened (open), the suppression of the signal transmittance from the antenna for reception 24 to the homodyne detection portion 26 is cancelled. Since multireflection between the homodyne detection portion 26 and the switch portion 94 can be suppressed, the resistor 96 is preferably made equal to a characteristic impedance of a transmission line connecting the antenna for reception 24 and the homodyne detection portion 26.

In the second embodiment with each of the above configurations, too, similarly to the first embodiment, the influence of the transient response can be suitably suppressed, and as a result, smooth communication can be performed.

FIG. 13 is a diagram for illustrating a configuration of an apparatus 98 for communicating with a RFID tag (signal processing unit), which is a third embodiment of the present invention. As shown in FIG. 13, the apparatus 98 for communicating with a RFID tag of this embodiment includes an antenna 100 for transmission/reception (antenna device) that transmits the transmission signal and receives the reply signal returned from the RFID tag 14 according to the transmission signal and a transmit-receive split portion 102 that supplies the transmission signal output from the transmission amplifier 20 to the antenna 100 for transmission/reception and supplies the receiving signal received by the antenna 100 for transmission/reception to the homodyne detection portion 26. In such a configuration, in the apparatus 98 for communicating with a RFID tag provided with the antenna 100 for transmission/reception, the influence of the transient response can be suitably suppressed, and as a result, smooth communication can be performed.

The first to third embodiments described above are not limited to the above modes but are practiced in further another mode.

For example, in the first to third embodiments, the signal transmittance control device 46, the timing determination device 48 and the like are provided as the control functions of the DSP 16, but the present invention is not limited to that, but controllers having the control functions may be provided individually, for example. Also, the control by the control functions may be either digital signal processing or analog signal processing.

Also, in the above first to third embodiments, an example (a): the signal transmittance adjustment devices 28, 36 are provided in the signal transmittance path between the homodyne detection portion 26 and the DSP 16; an example (b): the signal transmittance adjustment device 84 is provided in the signal transmittance path between the antenna for reception 24 and the homodyne detection portion 26, are described, but as long as the effect of the present invention to prevent crush of the head portion of the reply signal by the wrap around signal from the transmission side is exerted, the signal transmittance adjustment device may be provided at any position in the receiving circuit.

Also, in the above first to third embodiments, the homodyne detection portion 26 is used as a detection circuit, but since the equivalent effect can be obtained even with an apparatus provided with another circuit configuration such as heterodyne detection, it is needless to say that the present invention is suitably applied to an apparatus for communicating with a RFID tag provided with another circuit configuration.

Also, in the above first to third embodiments, though a reference was not particularly made for simplification of the description, it is needless to say that the present invention is suitably applied to an apparatus for communicating with a RFID tag provided with a cancel circuit that suppresses the wrap around signal from the transmission side and the like.

A fourth embodiment of the present invention will be described referring to FIGS. 14 to 18. This embodiment is an embodiment that easily realizes an apparatus for communicating with a RFID tag only by being attached to an information terminal.

FIG. 14 is a perspective view illustrating an appearance of a connector radio device as a signal processing unit of this embodiment and the information terminal to which the connector radio device is attached.

In FIG. 14, in this example, with respect to a laptop computer 2001 as a terminal main body of the information terminal (hereinafter referred to as PC 2001), a connector radio device 2003 as a signal processing unit can be attached to a USB connection portion 2002 provided at the PC 2001.

The connector radio device 2003 has a single independent main body portion 2004 in a rectangular solid shape and can be arbitrarily and detachably attached to the USB connection portion 2002 by a USB connector portion 2005 provided at the main body portion 2004 in this example. At attachment, using application software and the like stored in a memory of an attached side (PC 2001 in this case), three types of radio communication according to each standard of wireless LAN communication (first radio communication; IEEE802.11, and the like for example) to connect to a network such as LAN and the Internet through a wireless LAN access point 2006, for example, RFID communication (second radio communication; EPC Class 1 Generation 2 or ISO 15693 or the like, for example) for reading/writing information with respect to a RFID tag 2007, and wireless device communication (third radio communication; Bluetooth and the like) for information communication with wireless devices (a wireless mouse 2008 as an operation tool in an illustrated example) can be conducted.

FIG. 15 is a system configuration diagram of the connector radio device 2003 of this embodiment. In FIG. 15, the connector radio device 2003 includes, within a housing 2011 constituting the main body portion 2004, a CPU 2012, a LED (first notification device; notification device) 2013, a chime (second notification device. It may be a sound generating device such as a speaker and the like) 2014, a storage portion (storage device) 2015, a signal processing circuit 2016, a switch circuit 2017, a wireless LAN radio frequency circuit 2018, a RFID radio frequency circuit 2019, a wireless device radio frequency circuit 2020, and a USB communication control portion 2021, and the CPU 2012, the storage portion 2015, the signal processing circuit 2016, and the USB communication control portion 2021 are connected capable of transmission/reception of a control signal and data through a bus 2022.

The CPU 2012 is a so-called microcomputer incorporating a memory such as RAM and ROM and carries out signal processing according to a program stored in the ROM in advance while using a temporary storage function of the RAM, by which the switch circuit 2017 is controlled and communication is performed by arbitrarily switching between prohibition and permission of each of the wireless LAN communication, the RFID communication, and the wireless device communication, as well as management of data within the storage portion 2015 and communication control with the PC 2001 via the USB communication control portion 2021 are carried out.

The LED 2013 is turned on only while a control signal is being output from the CPU 2012, and the chime 2014 outputs a predetermined notification sound by a control signal output from the CPU 2012.

The storage portion 2015 is a storage device capable of reading and writing made up of a flash memory, for example, and is provided with an internal database 2023 that stores various settings and data required for communication with the wireless LAN and the wireless devices and stores various information relating to the RFID tag T. The internal database 2023 stores information in the form of correlation between the tag ID of the RFID circuit element To, which will be described later, and attribute information (product name, size, site for management, name of administrator and the like) of a target object corresponding to the tag ID, for example.

The wireless LAN radio frequency circuit 2018, the RFID radio frequency circuit 2019, and the wireless device radio frequency circuit 2020 are circuits configured to make an access (to carry out transmission/reception) to the wireless LAN access point 2006, the RFID tag 2007 or the wireless device 2008 through a wireless LAN internal antenna (antenna for equipment communication) 2024, a RFID internal antenna (antenna for tag communication, antenna device) 2025, and a wireless device internal antenna (antenna for operation) 2026, respectively. The configuration of each of the radio frequency circuits 2018, 2019 and 2020 will not be described in detail here, but each of them carries out modulation/demodulation according to the known respective radio communication method in a frequency band of 2.4 GHz (or 5 GHz) for the wireless LAN radio frequency circuit 2018, 13.56 MHz for the RFID radio frequency circuit 2019, and 27 MHz (or 2.4 GHz) for the wireless device radio frequency circuit 2020, for example.

The switch circuit 2017 is a circuit using a known FET, a diode or a relay, for example, and switches between connection/disconnection with the respective signal processing circuits 2016 of the wireless LAN radio frequency circuit 2018, the RFID radio frequency circuit 2019, and the wireless device radio frequency circuit 2020 by means of a control signal from the CPU 2012, for example. The signal processing circuit 2016 is a circuit configured to process a signal transmitted/received with the radio frequency circuits 2018, 2019 and 2020 and transmit/receive it to/from the CPU 2012 through the bus 2022 or vice versa.

The USB communication control portion 2021 is provided with the USB connector portion 2005 capable of being connected to the USB connection portion 2002 of the PC 2001 in this example and transmits/receives a signal transmitted/received to/from the CPU 2012 through the bus 2022 to/from the PC 2001 according to the USB (Universal Serial Bus) standard.

Also, the RFID tag 2007 is configured such that the RFID circuit element To is provided at a card-like or a label-like tag main body 2033, for example. The RFID circuit element To is provided with an IC circuit part 2031 configured to store RFID tag information including at least the tag ID (identification information of the RFID circuit element To) and a tag antenna 2032 configured to carry out transmission/reception of the RFID tag information.

In the above, in this fourth embodiment, as its distinguished feature, the RFID communication is exclusively controlled in relation to other standards in the connector radio device 2003 attached to the PC 2001. The details will be described below in order.

FIG. 16 is a flowchart illustrating a control procedure executed by the CPU 2012 of the connector radio device 2003. This control procedure is a procedure executed by application software of the PC 2001, and the CPU 2012 of the connector radio device 2003 controls the inside of the connector radio device 2003 so that the procedure of the following flow is assisted according to an instruction from the PC 2001.

In FIG. 16, if the fact that the corresponding application software is started at the PC 2001 is detected through the USB communication control portion 2021, this flow is started.

First, at Step S2005, an IP address (Internet Protocol Address) for making an access (See Step S2120 in FIG. 17, which will be described later) to an external database server (not particularly shown) using the wireless LAN communication through the wireless LAN radio frequency circuit 2018 is set and the routine goes to the subsequent Step S2010.

At Step S2010, a control signal is output to the switch circuit 2017 so as to connect the wireless LAN radio frequency circuit 2018 and the wireless device radio frequency circuit 2020 to the signal processing circuit 2016, respectively, and transmission/reception of a radio signal with the wireless LAN access point 2006 and receiving of a radio signal from the wireless mouse 2008 (wireless device in this example) are allowed. Moreover, the RFID radio frequency circuit 2017 is disconnected from the signal processing circuit 2016, and transmission/reception of a RFID command is prohibited.

Subsequently, the routine goes to Step S2015, where it is determined if a signal is received from the wireless mouse 2008 through the wireless device internal antenna 2026 and the wireless device radio frequency circuit 2020 or not. If the radio signal from the wireless mouse 2008 is received, the determination is satisfied, that is, it is considered that the wireless mouse 2008 is being operated by an operator, an operation signal received at the subsequent Step S2020 is transmitted to the PC 2001, and while the routine returns to Step S2015 and the operation signal is received, this loop is repeated so as to carry out the processing to the operation on the wireless mouse 2008. As mentioned above, while the loop is executed between Step S2015 and Step S2020, only the operation processing of the wireless mouse 2008 is carried out with priority over communication through the other wireless LAN and RFID.

On the other hand, if no signal is received from the wireless mouse 2008, the determination is not satisfied, that is, it is considered that the wireless mouse 2008 is not being operated, and the routine goes to the subsequent Step S2025.

At Step S2025, a control signal is output to the switch circuit 2017 so that the wireless LAN radio frequency circuit 2018 and the wireless device radio frequency circuit 2020 are disconnected from the signal processing circuit 2016, respectively, and the transmission/reception of the radio signal with the wireless LAN access point 2006 and the reception of the radio signal from the wireless mouse 2008 are prohibited. Then, the signal processing circuit 2016 is connected to the RFID radio frequency circuit 2019, and transmission/reception of a RFID command is allowed.

Subsequently, the routine goes to Step S2030, and transmission of the RFID command to the RFID tag 2007 is started. Specifically, a response request signal such as a "Scroll All ID" command that requests reply of a response signal if the RFID circuit element To receives it is created by the signal processing circuit 2016 and the signal is continued to be transmitted from the RFID radio frequency circuit 2019 and the RFID internal antenna 2025 toward the RFID circuit element To of the RFID tag 2007 (repeatedly with a predetermined interval, for example) till the procedure (See Step S2055 or Step S2075, which will be described later) to finish the transmission.

At the subsequent Step S2035, in order to show that the RFID communication is being made to the operator, a control signal is output to the LED 2013 so that it is turned on, and the routine goes to Step S2040.

At Step S2040, it is determined if there is the readable RFID tag 2007 or not. Specifically, it is determined if a response signal from the RFID circuit element To the response request command transmitted at Step S2030 has been received through the RFID internal antenna 2025 and the RFID radio frequency circuit 2019 or not. If there is a readable RFID tag 2007, that is, a response signal has been received, the determination is satisfied, and the routine goes to the subsequent Step S2045.

At Step S2045, from the response signal of the RFID circuit element To that can confirm reply of the response signal at Step S2040 and is taken into the signal processing circuit 2016, data such as a tag ID thereof and a corresponding article (target object) information and the like (should be stored in the IC circuit part 2031) is extracted and gotten.

Subsequently, the routine goes to Step S2050, where a control signal is output to the chime 2014 so as to notify the operator that the information reading of the RFID tag 2007 has been completed and to sound a notification sound, and a control signal is output to the signal processing circuit 2016 at the subsequent Step S2055 so as to finish the transmission of the RFID command having been continued since Step S2030. As for the notification to the operator at Step S2050, in addition to the notification sound from the chime 2014, it is also effective to turn on the LED 2013 in a mode different from that of Step S2035 (to turn it on in a different color or to flash it and the like).

Subsequently, the routine goes to Step S2060, where by means of the control similar to that in Step S2010, the transmission/reception of the RFID command is prohibited, the transmission/reception of the radio signal with the wireless LAN access point 2006 and the reception of the radio signal from the wireless mouse 2008 are allowed, and in order to show that the RFID communication is finished at the subsequent Step S2065 to the operator, a control signal is output to the LED 2013 to turn it off, and the routine goes to the subsequent Step S2100.

At Step S2100, tag information acquisition processing to get various corresponding tag information (target object information) from the database on the basis of the tag ID read out at Step S2045 is performed (See the flow in FIG. 17, which will be described later).

Subsequently, the routine goes to Step S2070, where it is determined if an operation signal to finish various radio communication has been input from the PC 2001 through the USB communication control portion 2021 or not, and if the finish operation has not been carried out, the determination is not satisfied, and the routine returns to Step S2015 and the similar procedure is repeated. On the other hand, if the finish operation is carried out, the determination is satisfied, and this flow is finished. This finish operation is carried out by pressing down a button reading "Stop" in a screen shown in FIG. 18, for example.

On the other hand, in the determination at Step S2040, if no readable RFID tag 2007 is found, that is, no response signal has been received from the RFID circuit element To, the determination is not satisfied, and the routine goes to Step S2075.

At Step S2075, a control signal is output to the signal processing circuit 2016 so as to finish the transmission of the RFID command having been continued since Step S2030. After that, at Step S2080, by means of the control similar to that of Step S2010, the transmission/reception of the radio signal with the wireless LAN access point 2006 and the reception of the radio signal from the wireless mouse 2008 are allowed, and then, at the subsequent Step S2085, in order to show that the RFID communication has been finished to the operator, a control signal is output to the LED 2013 so as to turn it off, and the routine returns to Step S2015 and the similar procedure is repeated.

By carrying out the above flow, while the wireless mouse 2008 is being operated, the operation processing of the wireless mouse 2008 is carried out with priority in the loop of Step S2015 and Step S2020, and in the procedure from Step S2025 to Step S2060 or to Step S2080, the wireless LAN communication and the wireless device communication are prohibited and only the RFID communication is carried out, and the wireless LAN communication can be carried out in the case other than that. That is, the wireless device communication is carried out with the most priority, while the RFID communication is carried out with priority over the wireless LAN communication exclusively of the wireless LAN communication.

FIG. 17 is a flowchart illustrating a detailed procedure of the tag information acquisition processing executed by the CPU 2012 at Step S2100 in FIG. 16.

In FIG. 17, first, at Step S2105, an access is made to the storage portion 2015, and a search is made in the internal database 2023 using the tag ID obtained at Step S2045 described above as a key.

Subsequently, the routine goes to Step S2110, where it is determined if the tag ID has been already registered in the internal database 2023 in the search at Step S2105 or not. If the tag ID has been registered, the determination is satisfied, the routine goes to Step S2115, where the tag information corresponding to the tag ID is searched and gotten, and the routine goes to Step S2140.

On the other hand, at the determination at Step S2110, if the tag ID is not registered, the determination is not satisfied, and the routine goes to the subsequent Step S2120.

At Step S2120, through the wireless LAN radio frequency circuit 2018, an access is made to an external database server (not particularly shown) on the basis of the IP address set at Step S2005 using the wireless LAN communication and the Internet, and in the external database server in which the latest tag information is accumulated in a larger capacity, the search is conducted using the tag ID as a key.

Subsequently, the routine goes to Step S2125, where it is determined if the tag ID has been already registered in the external database server in the search at Step S2120 or not. If the tag ID has been registered, the determination is satisfied, the tag information corresponding to the tag ID is searched and gotten at Step S2130, and the routine goes to Step S2140.

On the other hand, if the tag ID is not registered in the determination at Step S2125, the determination is not satisfied, and at the subsequent Step S2135, the fact that the tag ID is not registered in any database is notified through the USB communication control portion 2021 (a notice signal is output), and this flow is finished.

At Step S2140 to which the routines goes after the radio tag information (corresponding article information, that is, target object information and the like) corresponding to the tag ID is gotten at Step S2115 or Step S2130, the gotten RFID tag information is output to the PC 2001 as a search result through the USB communication control portion 2021, and at the PC 2001, the information is provided to a user by a screen output as exemplified in the above-mentioned FIG. 18, and this flow is finished.

In the above, the procedure at Step S2010, Step S2015, Step S2025, Step S2060, and Step S2080 in the flow in FIG. 16 is given priority to the RFID communication over the wireless LAN communication, and the wireless LAN communication by the wireless LAN internal antenna 2024 is allowed when the RFID communication by the RFID internal antenna 2025 is not carried out, and the priority is given to the wireless device communication over the RFID communication, and the procedure functions as a priority control portion that allows the RFID communication by the RFID internal antenna 2025 when the wireless device communication is not carried out by the wireless device internal antenna 2026.

Also, the procedure at Step S2045 in the flow in FIG. 16 functions as an identification information acquisition portion that obtains the tag ID of the RFID circuit element To via the RFID communication by the RFID internal antenna 2025.

In the fourth embodiment configured as above, by providing the wireless LAN internal antenna 2024 provided with a network connection function to other devices and the RFID internal antenna 2025 provided with an information transmission/reception function to the RFID circuit element To at the connector radio device 2003, only by attaching the connector wireless device 2003 to the PC 2001, which is a usual information terminal, the PC can function as a network device and a RFID tag communication device. That is, a RFID tag communication device capable of network connection can be easily realized.

At this time, since the RFID communication carried out using the RFID internal antenna 2025 and the wireless LAN communication carried out using the wireless LAN internal antenna 2024 are exclusively controlled, occurrence of radio wave interference caused by co-existence of the both radio communications at the same timing can be prevented, smooth communication can be ensured for the RFID circuit element To and reliability of information transmission/reception can be improved.

Also, particularly in this fourth embodiment, since the wireless LAN communication carried out using the wireless LAN internal antenna 2024 is allowed (permitted) only when the RFID communication using the RFID internal antenna 2025 is not carried out according to the procedure at Step S2010, Step S2025, Step S2060, and Step S2080 in the flow in FIG. 16, occurrence of the radio wave interference caused by co-existence of the wireless LAN communication in the RFID communication can be surely prevented.

Also, particularly in this fourth embodiment, when the operation signal corresponding to the operation of the wireless mouse 2008 is input at the wireless device internal antenna 2026 via the wireless device communication, various operations corresponding to the operation can be carried out on the side of the PC 2001. At this time, by means of the procedure at Step S2015 in the flow of FIG. 16, the RFID communication using the RFID internal antenna 2025 is allowed (permitted) only when the wireless device communication using the wireless device internal antenna 2024 is not carried out. As a result, even if the wireless mouse 2008 is used via radio communication, the occurrence of the radio wave interference in the RFID communication can be surely prevented.

Also, particularly in this fourth embodiment, since the LED 2013 that is turned on to be notified when the RFID communication is to be made by means of the RFID internal antenna 2025 is provided, the fact that the information transmission/reception is being carried out with the RFID circuit element To via the RFID communication can be made to be surely recognized by the operator. First notification device so as to make the fact that the information is being transmitted/received recognized is not limited to the LED 2013 but may be carried out in another mode such as notification on the display screen of the PC 2001, for example.

Also, particularly in this fourth embodiment, since the connector radio device 2003 has the internal database 2023 that can store at least the correlation between the tag ID of the RFID circuit element To and the information of the target object corresponding to that, the corresponding target object information and the like can be gotten by making an access to the internal database 2023 using the tag ID of the RFID circuit element To obtained by the procedure at Step S2045 in FIG. 16.

Also, particularly in this fourth embodiment, since when the tag ID is successfully obtained by the procedure at Step S2045 in FIG. 16, the chime 2014 that emits a predetermined notification sound corresponding to that is provided, as the result of the information transmission/reception via the RFID communication with the RFID circuit element To, the fact that the obtainment of the tag ID is successful can be surely made to be recognized by the operator. A second notification device that has the successful information transmission/reception recognized is not limited to the notification sound from the chime 2014 but may be carried out in another mode such as the notification on the display screen of the PC 2001, for example.

In this fourth embodiment, the RFID communication by the RFID internal antenna 2025 and the wireless LAN communication by the wireless LAN internal antenna 2024 are executed by being switched in a procedure range (that is, in a procedure range of the flow) in each control procedure, but the present invention is not limited to that, but the processing of each radio communication may be executed by time-division processing in which forced switching is made after a predetermined short time (executed by being switched temporally). The control procedure of the time-division switching at this time functions as a switching control portion. As a result, since the wireless LAN communication is executed in a time different from that of the RFID communication by the control procedure of the time-division switching, occurrence of the radio wave interference in the RFID communication can be prevented.

Also, if the IC circuit part 2031 of the RFID circuit element To provided at the RFID tag 2007 has a rewritable memory part, after the reading of the tag ID at Step S2045 in the flow of FIG. 16, for example, it may be so configured that a writing control procedure is newly provided between Step S2045 and Step S2050 so that using the tag ID obtained at Step S2045, the RFID circuit element To be written is specified, and predetermined information is written in the IC circuit part 2031 of the specified RFID circuit element To using a "Program" signal and the like. The control procedure to write the information at this time functions as the writing control portion.

Also, in this fourth embodiment, the laptop computer 2001 is used as the terminal main body of the information terminal to which the connector radio device 2003 is attached, but the present invention is not limited to that, other information devices such as other printers, projectors and the like having the USB connection portion 2002, for example, may be used. Also, as for the wireless devices, they can be applied to other radio communication devices other than the wireless mouse 2008.

Moreover, also as for the hardware interface that transmits/receives information signals and instruction signals between the connector radio device 2003, which is a signal processing unit, and the laptop computer 2001 as the terminal main body, the similar effect can be also obtained by using other hardware interfaces other than the USB used in the fourth embodiment (IEEE 1394, IrDA and the like, for example).

In the above, the RFID communication (second radio communication) for information reading/writing with respect to the RFID tag 2007 is controlled exclusively of the wireless LAN communication (first radio communication) for connection to the network such as LAN and the Internet, but not limited to that. That is, if a filter device that can prevent cross talk in receiving is provided on the side of the connector radio device 2003, for example, when information is received from the RFID tag 2007 (when only carrier is continuously transmitted), the RFID communication and the wireless LAN communication may be made at the same time as long as the frequencies (or channels) are different. That is, in this case, the exclusive control made only in the communication that transmits a command to the RFID tag 2007 (RFID command transmission) will suffice. In this case, too, occurrence of the radio wave interference by the both radio communications can be prevented.

The "Scroll ID" signal, the "Program" signal and the like used in the above shall comply with the specification formulated by EPC global. The EPC global is a non-profit corporation jointly established by International EAN Association, which is an international organization of distribution codes, and UCC (Uniformed Code Council), which is an U.S. distribution code organization. Signals complying with other standards will do as long as they serve the same functions.

Other than those mentioned above, methods of the first to fourth embodiments and each variation may be combined as appropriate for use.

Though not specifically exemplified, the present invention should be put into practice with various changes made in a range not departing from its gist.

What is claimed is:

1. A signal processing unit comprising:
at least one antenna device relating to a plurality of signal processing including processing of a communication signal with a RFID tag as a communication target, said antenna device including an antenna for transmission and an antenna for reception;
a priority control portion configured to control so that one signal processing among said plurality of signal processing is performed with priority over the other processings;
a transmission processing device configured to transmit a transmission signal to said RFID tag from said antenna for transmission; and
a receiving processing device configured to receive a reply signal returned from said RFID tag in response to said transmission signal by said antenna for reception and to perform processing of the received receiving signal, and said priority control portion includes:
a signal transmittance adjustment device that can suppress transmittance of the receiving signal from said antenna for reception to said receiving processing device as said other signal processing; and a signal transmittance control device configured to control said signal transmittance adjustment device so that the transmittance of the receiving signal from said antenna for reception to said receiving processing device is suppressed at least while a transmission signal including a modulation signal is transmitted from said antenna for transmission as said one signal processing.

2. The signal processing unit according to claim 1, further comprising a second receiving processing device configured to perform processing of the receiving signal received by said antenna for reception and supply it to said receiving processing device prior to the processing by said receiving processing device, wherein:
said signal transmittance control device is provided in a signal transmittance path between said second receiving processing device and said receiving processing device.

3. The signal processing unit according to claim 1, further comprising a timing determination device configured to determine whether or not a response on the basis of said modulation signal is started from said RFID tag, wherein:
said signal transmittance control device controls said signal transmittance adjustment device so that if determination by said timing determination device is affirmed, the suppression of the transmittance of said receiving signal from said antenna for reception to said receiving processing device is cancelled.

4. The signal processing unit according to claim 1, further comprising a capacitor configured to remove a direct current component of said receiving signal in a transmittance path of said receiving signal.

5. The signal processing unit according to claim 4, wherein:
said signal transmittance adjustment device suppresses the transmittance of said receiving signal by short-circuiting both electrodes of said capacitor.

6. The signal processing unit according to claim 1, wherein:
said signal transmittance adjustment device suppresses the transmittance of said receiving signal by grounding the transmittance path of said receiving signal.

7. The signal processing unit according to claim 1, wherein:
said signal transmittance adjustment device suppresses the transmittance of said receiving signal by cutting off said transmittance path of said receiving signal.

8. The signal processing unit according to claim 1, wherein:
said signal transmittance adjustment device includes a variable attenuation device in the transmittance path of said receiving signal and suppresses the transmittance of said receiving signal by changing an attenuation rate of said variable attenuation device.

9. The signal processing unit according to claim 1, wherein:
said signal transmittance adjustment device includes a variable amplification device in the transmittance path of said receiving signal and suppresses the transmittance of said receiving signal by changing a gain of said variable amplification device.

10. The signal processing unit according to claim 1, wherein:
said antenna for transmission and said antenna for reception are provided individually.

11. The signal processing unit according to claim 1, wherein:
a single antenna for transmission and reception configured to transmit said transmission signal and receive the reply signal returned from said RFID tag in response to said transmission signal is provided, as said antenna for transmission as well as said antenna for reception.

12. A signal processing unit configured to be detachable from an information terminal, comprising:
at least one antenna device relating to a plurality of signal processings including processing of a communication signal with a RFID tag as a communication target; and
a priority control portion configured to control so that one signal processing among said plurality of signal processing is performed with priority over the other processings:
an antenna for equipment communication configured to establish a network-connection with other equipment via first radio communication as said other signal processing, wherein:
said antenna device includes an antenna for tag communication configured to perform information transmission/reception via second radio communication as said one signal processing different from said first radio communication with respect to a RFID circuit element provided at said RFID tag and having an IC circuit part storing information and a tag antenna configured to perform information transmission/reception; and
said priority control portion puts priority on said second radio communication over said first radio communication and allows said first radio communication by said antenna for equipment communication when said second radio communication is not performed by said antenna for tag communication.

13. The signal processing unit according to claim 12, wherein:
said antenna for tag communication is configured to perform information transmission/reception with respect to said RFID circuit element by means of said second radio communication controlled exclusively with said first radio communication.

14. The signal processing unit according to claim 13, further comprising a switching control portion configured to control the radio communication so as to be performed by means of switching temporally between said second radio communication by said antenna for tag communication and said first radio communication by said antenna for equipment communication.

15. The signal processing unit according to claim 13, further comprising a first notification device configured to make predetermined notification when said second radio communication is performed by said antenna for tag communication.

16. The signal processing unit according to claim 13, further comprising an identification information acquisition portion configured to get identification information of said RFID circuit element via said second radio communication by said antenna for tag communication.

17. The signal processing unit according to claim 16, further comprising a storage device able to store at least correlation between said identification information of said RFID circuit element and identification information of a target object corresponding to the identification information of said RFID circuit element.

18. The signal processing unit according to claim 16, further comprising a second notification device configured to, when said identification information is successfully gotten by said identification information acquisition portion, make corresponding predetermined notification.

19. The signal processing unit according to claim 13, further comprising a writing control portion configured to write predetermined information in said IC circuit part of said RFID circuit element via said second radio communication by said antenna for tag communication.

20. The signal processing unit according to claim 12, further comprising an antenna for operation configured to receive an operation signal from an operation tool via third radio communication, wherein:

said priority control portion puts priority on said third radio communication over said second radio communication and allows said second radio communication by said antenna for tag communication when said third radio communication is not performed by said antenna for operation.

\* \* \* \* \*